US008135524B2

(12) United States Patent
Yoneda et al.

(10) Patent No.: US 8,135,524 B2
(45) Date of Patent: Mar. 13, 2012

(54) VEHICLE DRIVING FORCE CONTROL DEVICE

(75) Inventors: Takeshi Yoneda, Tokyo (JP); Keisuke Hosokawa, Tokyo (JP); Koichi Inoue, Tokyo (JP); Hirowatari Yosuke, Tokyo (JP); Tomohiro Yamada, Tokyo (JP); Koji Matsuno, Tokyo (JP); Masaru Kogure, Tokyo (JP); Satoru Akiyama, Tokyo (JP); Masato Igarashi, Tokyo (JP); Yosuke Morokuma, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1085 days.

(21) Appl. No.: 12/010,422

(22) Filed: Jan. 24, 2008

(65) Prior Publication Data
US 2008/0201051 A1 Aug. 21, 2008

(30) Foreign Application Priority Data

Jan. 26, 2007 (JP) ................................. 2007-016854
Mar. 22, 2007 (JP) ................................. 2007-075634

(51) Int. Cl.
*B60K 28/16* (2006.01)
(52) U.S. Cl. ............................. 701/69; 701/83; 180/197
(58) Field of Classification Search ................. 701/1, 69, 701/88, 90, 83; 180/197
See application file for complete search history.

(56) References Cited

U.S. PATENT DOCUMENTS

| 5,357,434 | A | 10/1994 | Zimmer et al. | |
| 5,826,209 | A * | 10/1998 | Matsuno | 701/69 |
| 6,131,054 | A * | 10/2000 | Shibahata | 701/1 |
| 7,702,442 | B2 * | 4/2010 | Takenaka | 701/48 |
| 2003/0144777 | A1 | 7/2003 | Schmitt | |
| 2003/0214181 | A1 | 11/2003 | Polzin | |
| 2008/0133066 | A1 * | 6/2008 | Takenaka | 701/1 |
| 2010/0299019 | A1 | 11/2010 | Igarashi | |

FOREIGN PATENT DOCUMENTS

| DE | 41 02 301 | 1/1991 |
| DE | 102 38 219 | 8/2002 |
| DE | 101 60 049 | 4/2006 |
| JP | 10-310042 | 11/1998 |

* cited by examiner

*Primary Examiner* — Mark Hellner
(74) *Attorney, Agent, or Firm* — Smith, Gambrell & Russell, LLP

(57) ABSTRACT

A driving force control device includes an individual-wheel friction-circle limit-value calculating portion that calculates friction-circle limit-values of individual wheels, an individual-wheel requested-resultant-tire-force calculating portion that calculates requested resultant tire forces of the individual wheels, an individual-wheel resultant-tire-force calculating portion that calculates resultant tire forces of the individual wheels, an individual-wheel requested-excessive-tire-force calculating portion that calculates requested excessive tire forces of the individual wheels, an individual-wheel excessive-tire-force calculating portion that calculates excessive tire forces of the individual wheels, an excessive-tire-force calculating portion that calculates an excessive tire force, an over-torque calculating portion that calculates an over-torque, and a control-amount calculating portion that calculates a control amount that is output to an engine control unit.

9 Claims, 14 Drawing Sheets

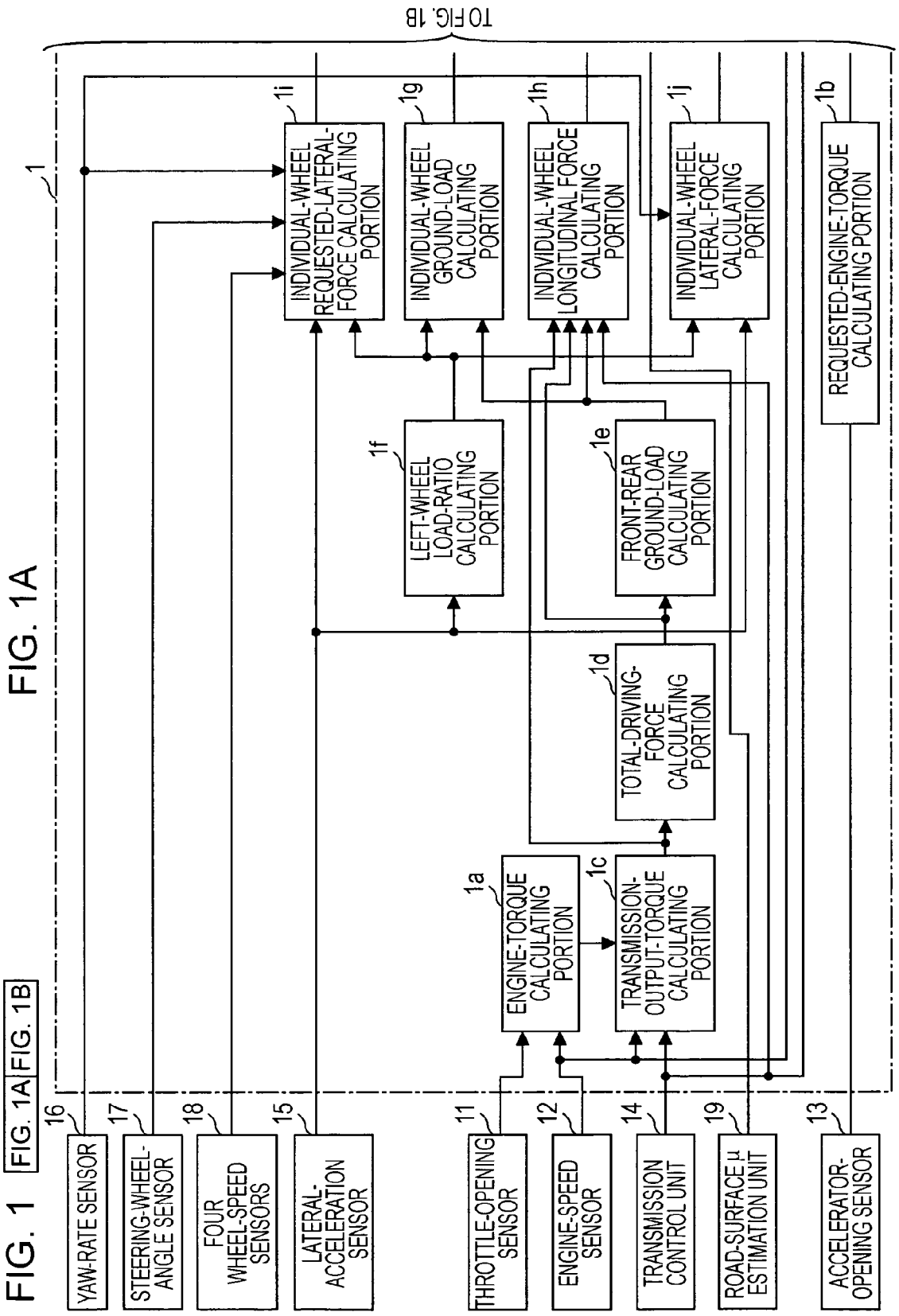

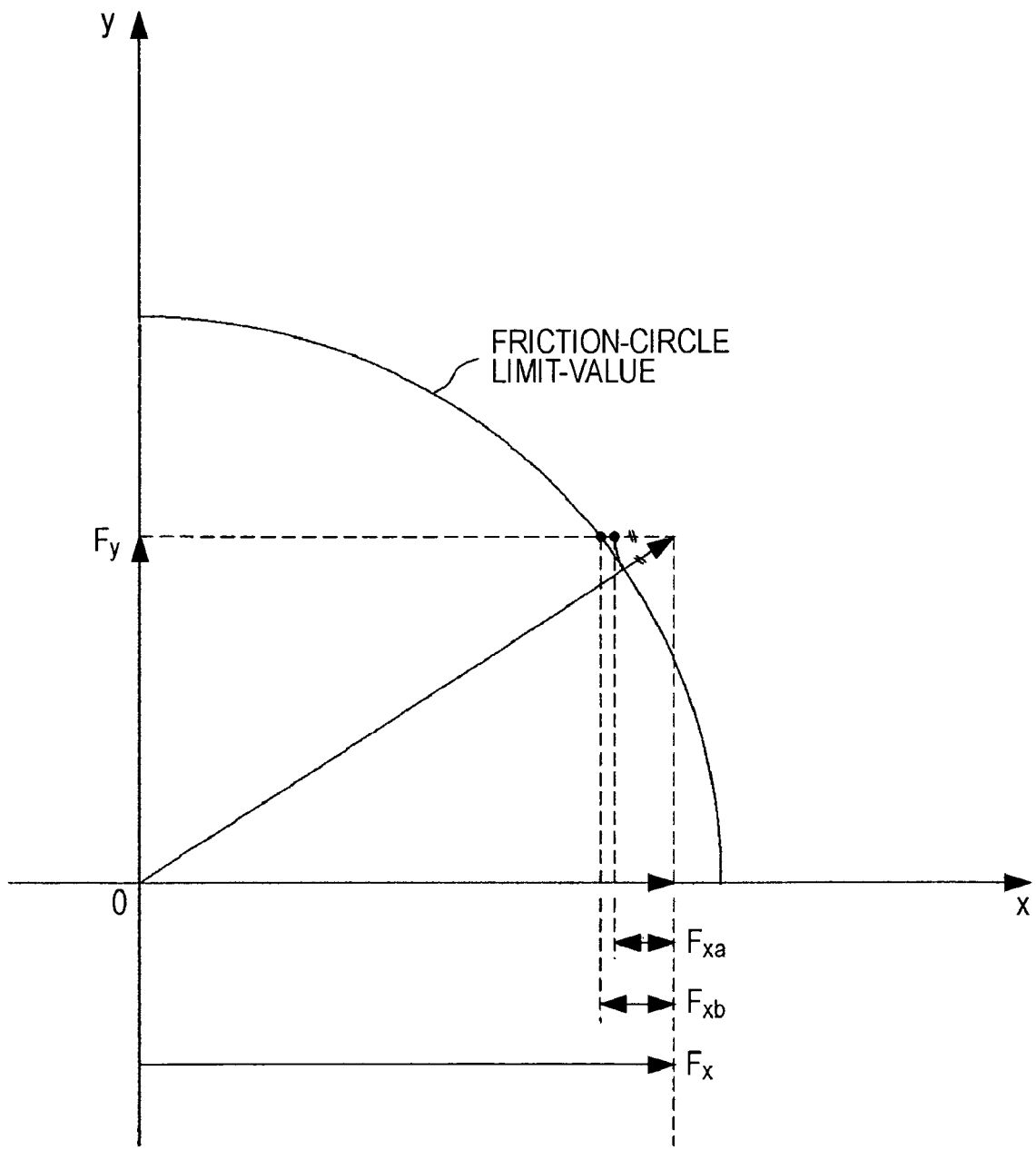

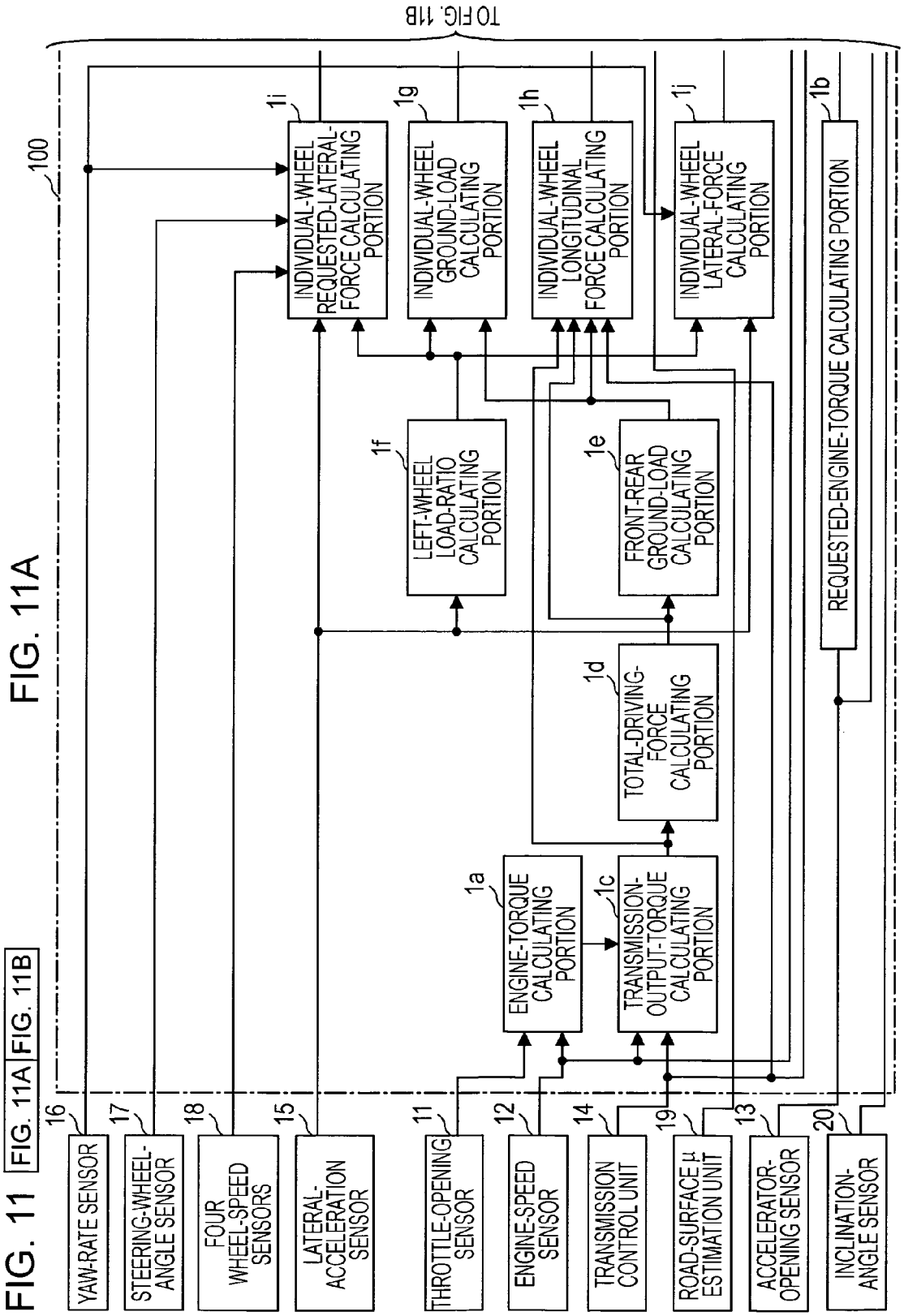

VEHICLE DRIVING FORCE CONTROL DEVICE

CROSS REFERENCES TO RELATED APPLICATIONS

The disclosure of Japanese Patent Application No. 2007-016854 filed on Jan. 26, 2007 and Japanese Patent Application No. 2007-075634 filed on Mar. 22, 2007 including the specifications, drawings, and abstracts are incorporated by references herein.

BACKGROUND OF THE INVENTION

1. Field of the Invention

The present invention relates to a vehicle driving force control device for controlling a driving force so as to appropriately maintain grip forces of vehicle wheels.

2. Description of the Related Art

In recent years, various types of vehicle driving force control devices that inhibit an excessive driving force to maintain grip forces of vehicle wheels have been developed and put to practical use. For example, Japanese Unexamined Patent Application Publication No. 10-310042 discloses a technology in which an estimate value of a friction-circle radius of each wheel is determined, and a resultant force of a lateral force and a longitudinal force generated on each wheel estimated from the driving condition of the vehicle is adjusted within a range not exceeding the estimate value of the friction-circle radius.

However, the technology disclosed in Japanese Unexamined Patent Application Publication No. 10-310042 is such that it simply tries to keep a currently generated resultant force of a lateral force and a longitudinal force within the estimate value of the friction-circle radius.

For this reason, this technology is disadvantageous in that it cannot respond effectively to a driving force that may presumably be generated in the future. Therefore, with this technology, for example, if the vehicle is currently spinning, a proper response to the situation is possible, whereas if the vehicle is in a plowing condition, a proper response to the situation is not possible.

In addition, if the grip forces of the wheels are precisely applied and the engine output is reduced, a drawback may possibly occur during uphill driving on, for example, a slope.

SUMMARY OF THE INVENTION

The present invention has been made under such circumstances, and it is an object of the present invention to provide a vehicle driving force control device that inhibits not only an excessive driving force generated in the present but also an excessive driving force presumably generated in the future, and that appropriately maintains the grip forces of tires to allow for improved driving stability of the vehicle.

It is another object of the present invention to provide a vehicle driving force control device that properly prevents a drawback from occurring during uphill driving on, for example, a slope, that inhibits not only an excessive driving force generated in the present but also an excessive driving force presumably generated in the future, and that appropriately maintains the grip forces of tires to allow for improved driving stability of the vehicle.

According to an aspect of the present invention, a vehicle driving force control device is provided, which includes first-tire-force estimating means configured to estimate a tire force to be generated on a wheel based on a request from a driver as a first tire force; second-tire-force estimating means configured to estimate a tire force currently being generated on the wheel as a second tire force; friction-circle limit-value setting means configured to set a friction-circle limit-value of a tire force; first-excessive-tire-force estimating means configured to estimate a tire force exceeding the friction-circle limit-value on the basis of the first tire force and the friction-circle limit-value as a first excessive tire force; second-excessive-tire-force estimating means configured to estimate a tire force exceeding the friction-circle limit-value on the basis of the second tire force and the friction-circle limit-value as a second excessive tire force; and driving-force correcting means configured to correct a driving force on the basis of the first excessive tire force and the second excessive tire force.

In the vehicle driving force control device, the driving-force correcting means may compare the first excessive tire force with the second excessive tire force, and may correct the driving force on the basis of the larger one of the two excessive tire forces.

In the vehicle driving force control device, the driving-force correcting means may correct the driving force by subtracting the larger one of the two excessive tire forces from a driving force requested by the driver.

In the vehicle driving force control device, the driving-force correcting means may correct the driving force by subtracting a longitudinal-direction component of the larger one of the two excessive tire forces from a driving force requested by the driver.

The vehicle driving force control device may further include road-surface slope detecting means configured to detect a road-surface slope of a road being driven on. In that case, the driving-force correcting means determines a lower limit of the driving force based on the road-surface slope and sets the driving force to the lower limit when the corrected driving force is under the lower limit.

The vehicle driving force control device may further include accelerator-opening detecting means configured to detect an accelerator opening. In that case, if the driving-force correcting means cannot determine the lower limit of the driving force based on the road-surface slope, the driving-force correcting means determines the lower limit of the driving force based on the opening, and sets when the corrected driving force is under the second lower limit.

Accordingly, the present invention can provide a vehicle driving force control device that inhibits not only an excessive driving force generated in the present but also an excessive driving force presumably generated in the future, and that appropriately maintains the grip forces of the tires to allow for improved driving stability of the vehicle.

In addition, the present invention can also provide a vehicle driving force control device that properly prevents a drawback from occurring during uphill driving on, for example, a slope, that inhibits not only an excessive driving force generated in the present but also an excessive driving force presumably generated in the future, and that appropriately maintains the grip forces of the tires to allow for improved driving stability of the vehicle.

BRIEF DESCRIPTION OF THE DRAWINGS

These and other objects and advantages of the present invention will become clear from the following description with reference to the accompanying drawings, wherein:

FIG. 10 illustrates an excessive tire force that is to be inhibited;

DESCRIPTION OF THE PREFERRED EMBODIMENTS

Embodiments of the present invention will now be described with reference to the drawings.

First Embodiment

Figure 1B:
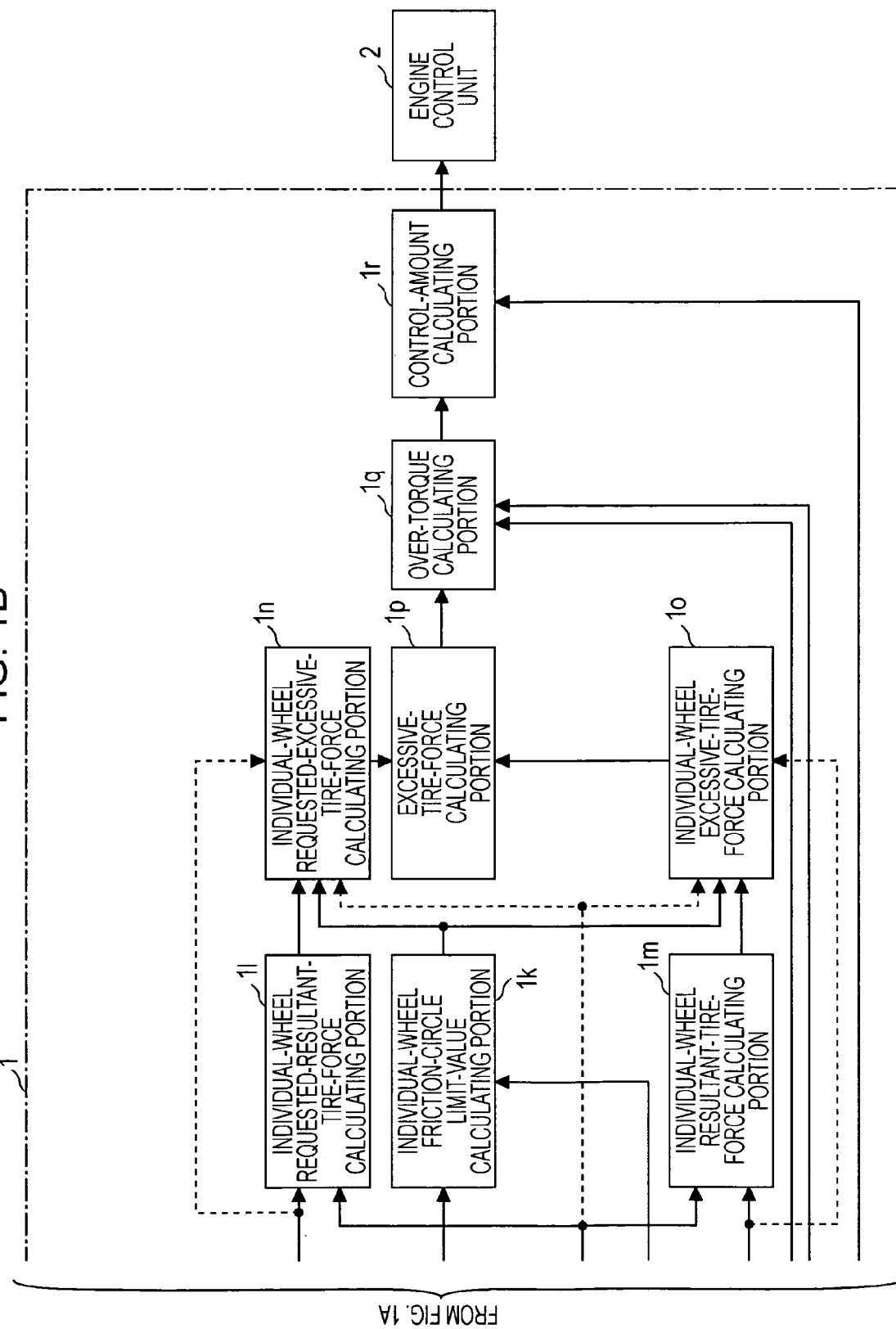
FIG. 1 is a functional block diagram of a driving force control device according to a first embodiment.
Figure 2:
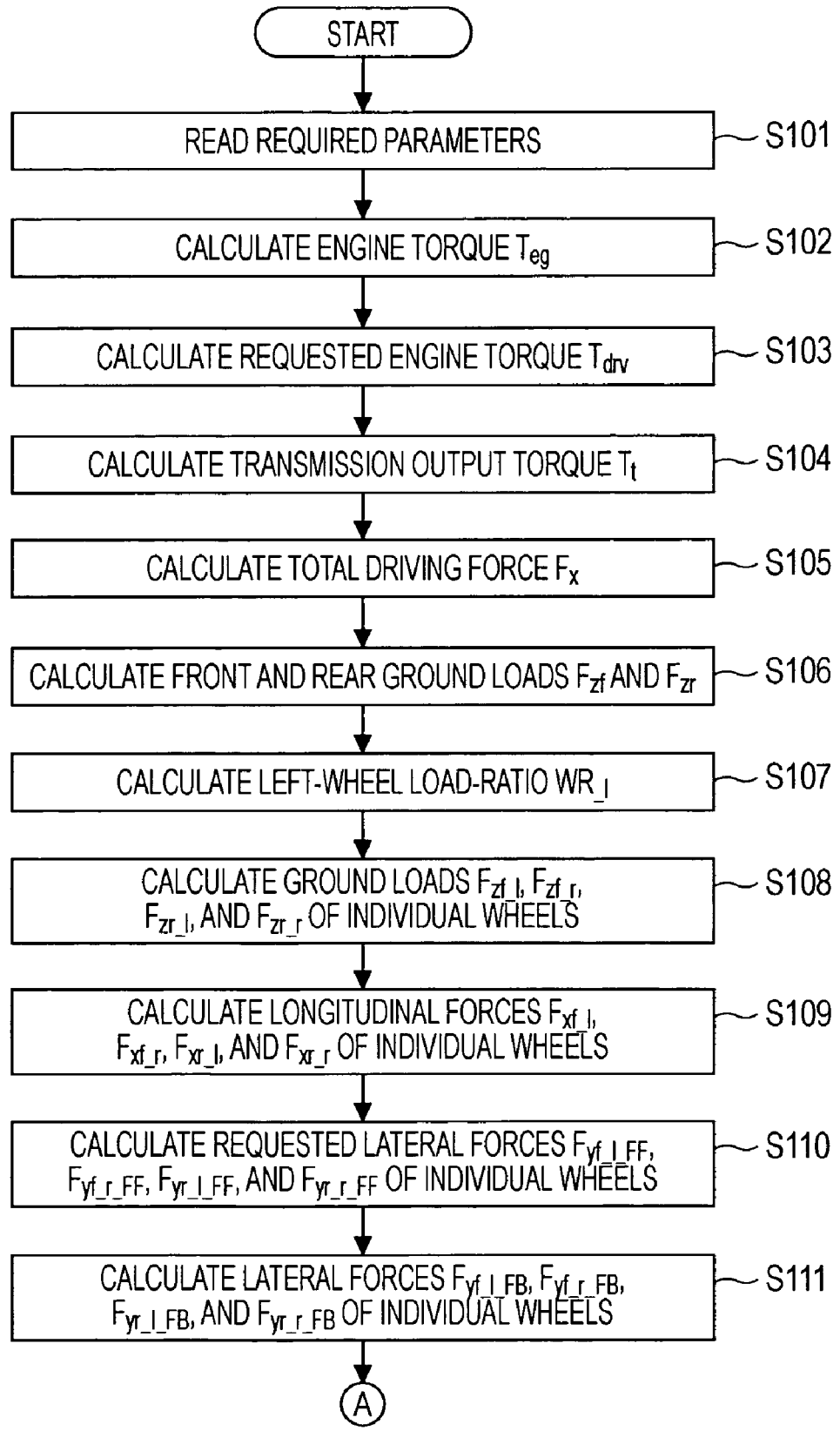
FIG. 2 is a flow chart of a driving force control program.
Figure 3:
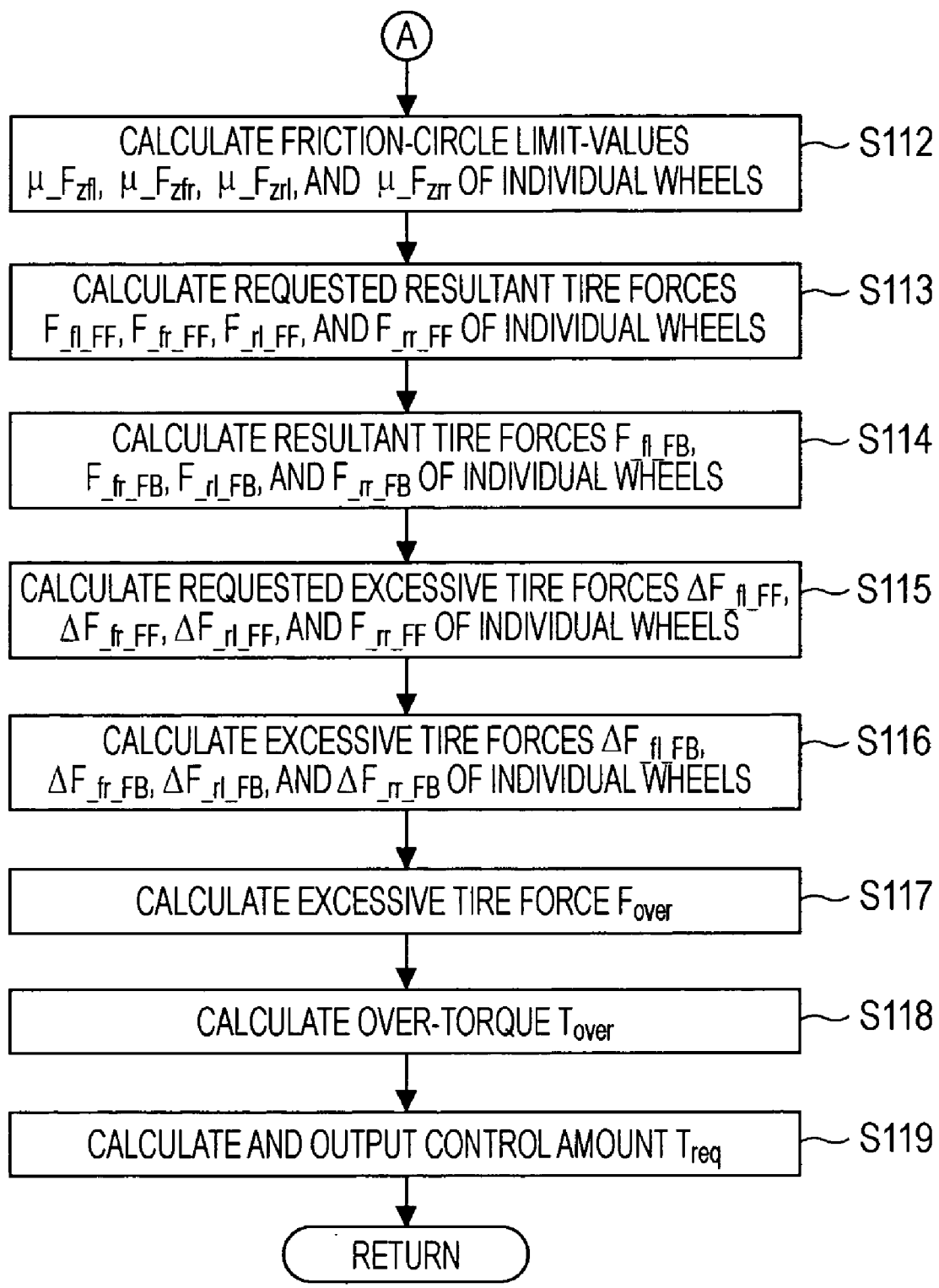
FIG. 3 is a flow chart continuing from that in FIG. 2.
Figure 4:
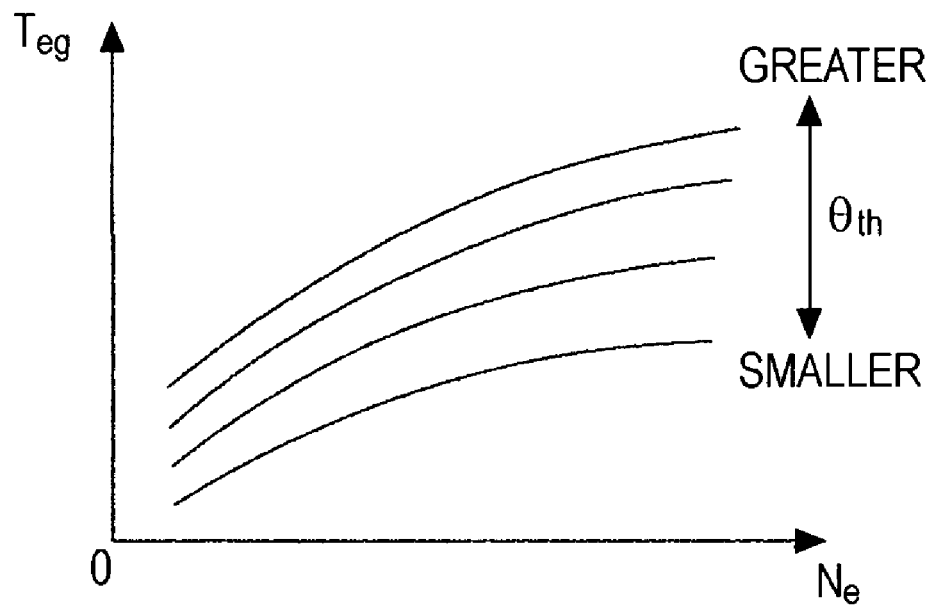
FIG. 4 illustrates examples of an engine torque set on the basis of an engine speed and a throttle opening.
Figure 5:
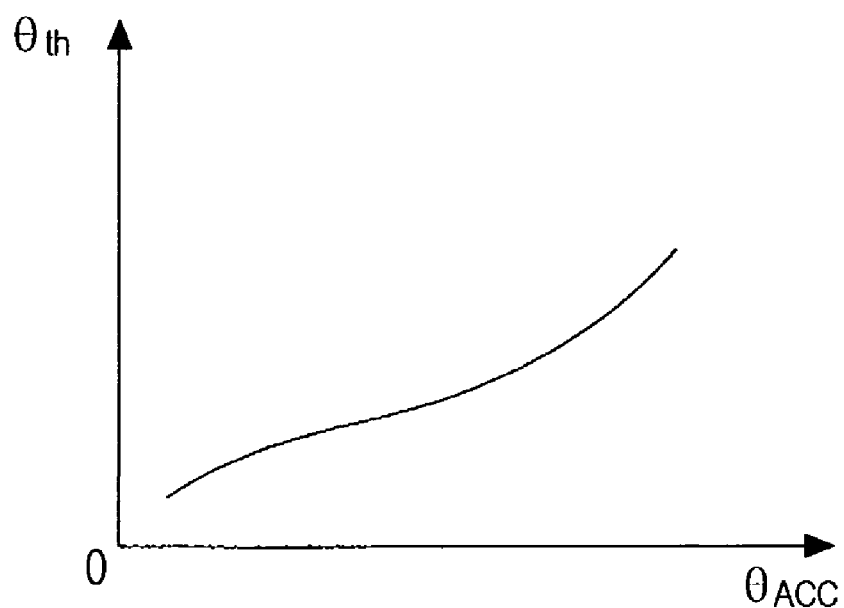
FIG. 5 illustrates an example of a relationship between an accelerator opening and a throttle opening for generating a requested engine torque.
Figure 6:
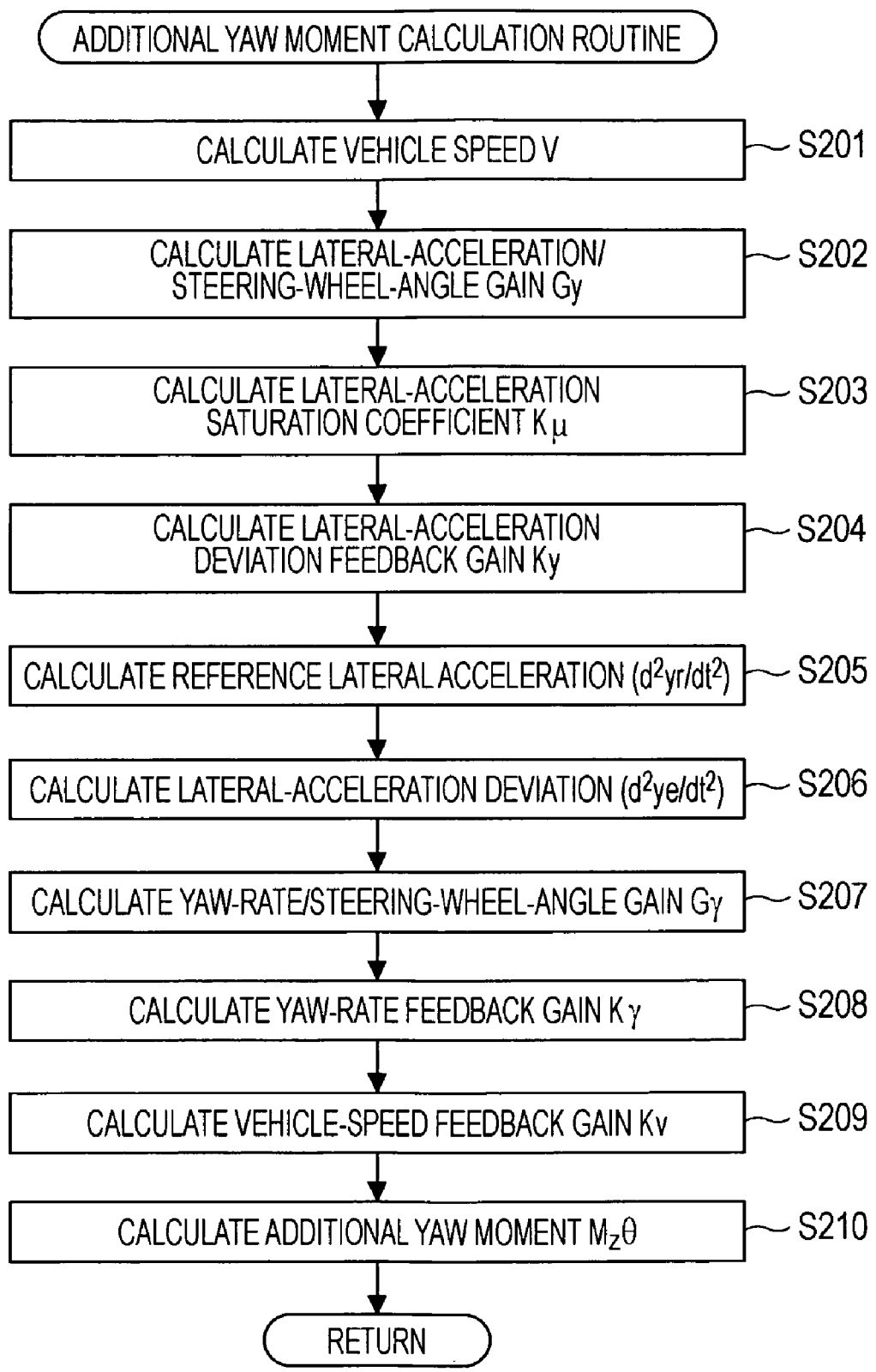
FIG. 6 is a flow chart of an additional-yaw-moment calculation routine.
Figure 7A:
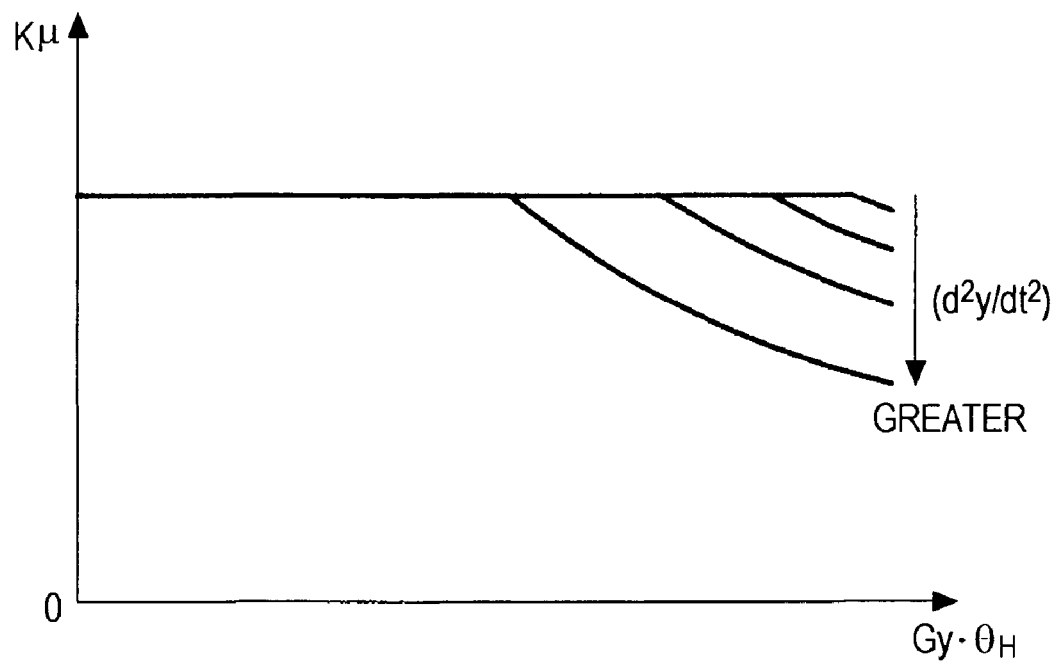
FIGS. 7A and 7B illustrate a lateral-acceleration saturation coefficient.
Figure 7B:
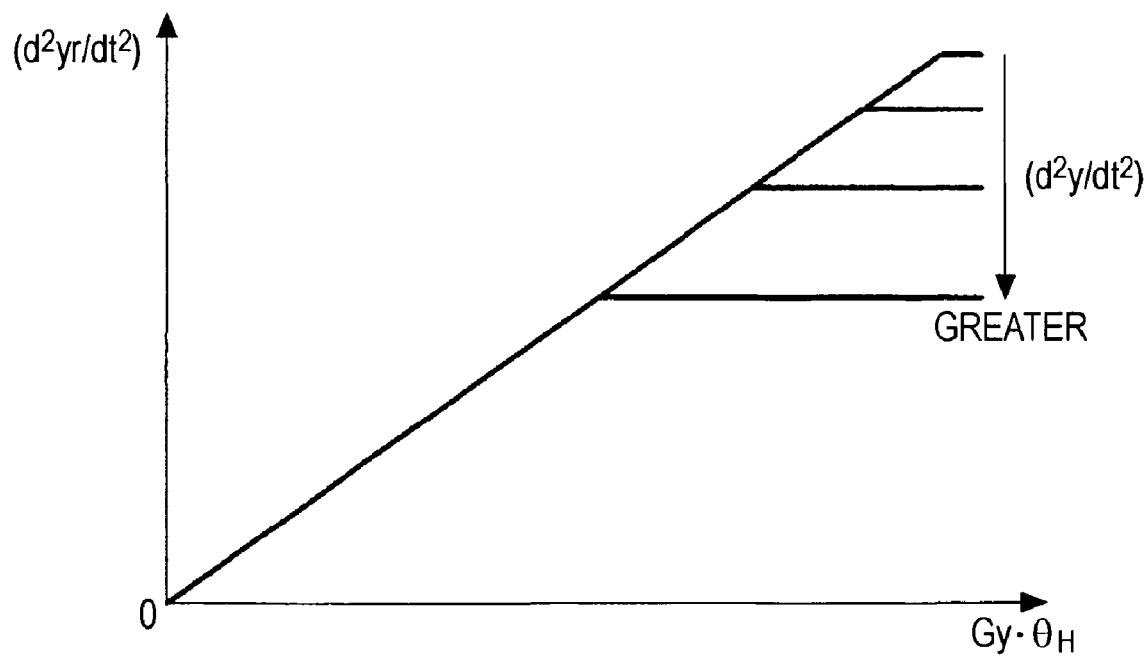
Figure 8:
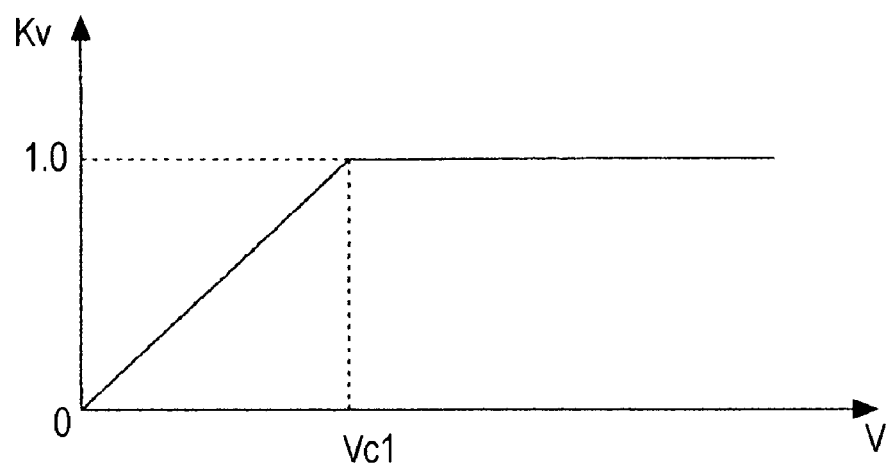
FIG. 8 shows a characteristic map of a vehicle-speed feedback gain.
Figure 9:
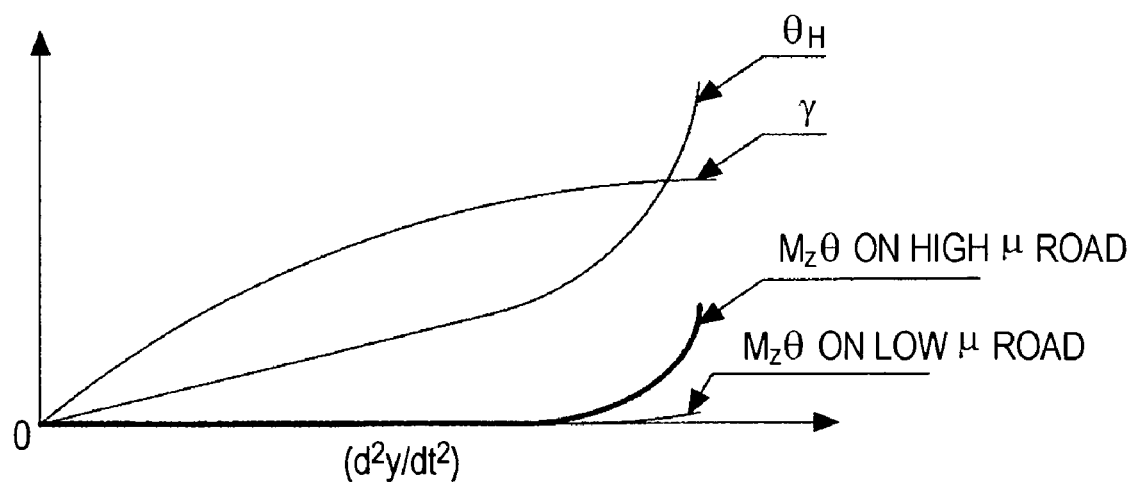
FIG. 9 illustrates a difference in additional yaw moment value between a high μ road and a low μ road.

FIGS. 1 to 10 illustrate a first embodiment of the present invention. FIG. 1 is a functional block diagram of a driving force control device. FIG. 2 is a flow chart of a driving force control program. FIG. 3 is a flow chart continuing from that in FIG. 2. FIG. 4 illustrates examples of an engine torque set on the basis of an engine speed and a throttle opening. FIG. 5 illustrates an example of a relationship between an accelerator opening and a throttle opening for generating a requested engine torque. FIG. 6 is a flow chart of an additional-yaw-moment calculation routine. FIGS. 7A and 7B illustrate a lateral-acceleration saturation coefficient. FIG. 8 shows a characteristic map of a vehicle-speed feedback gain. FIG. 9 illustrates a difference in additional yaw moment value between a high μ road and a low μ road. FIG. 10 illustrates an excessive tire force that is to be inhibited. In the first embodiment, the vehicle is directed to a four-wheel-drive vehicle equipped with a center differential as an example. In this vehicle, a limited-slip differential clutch (tightening torque $T_{LSD}$) allows a longitudinal driving-force distribution to be adjustable on the basis of a base torque distribution $R_{f\_cd}$ by the center differential.

Referring to FIG. 1, reference numeral 1 denotes a vehicle driving force control device installed in a vehicle and for appropriately controlling a driving force. The driving force control device 1 is connected to a throttle-opening sensor 1l, an engine-speed sensor 12, an accelerator-opening sensor 13, a transmission control unit 14, a lateral-acceleration sensor 15, a yaw-rate sensor 16, a steering-wheel-angle sensor 17, wheel-speed sensors 18 for individual wheels, and a road-surface μ estimation unit 19, and receives therefrom a throttle opening $\theta_{th}$, an engine speed $N_e$, an accelerator opening $\theta_{ACC}$, a main transmission gear ratio i, a turbine speed $N_t$ of a torque converter, a tightening torque $T_{LSD}$ of a limited-slip differential clutch, a lateral acceleration $(d^2y/dt^2)$, a yaw rate γ, a steering-wheel angle $\theta_H$, wheel speeds $\omega_{fl}$, $\omega_{fr}$, $\omega_{rl}$, and $\omega_{rr}$ of the individual wheels (the additional characters "fl", "fr", "rl", and "rr" respectively indicating a front left wheel, a front right wheel, a rear left wheel, and a rear right wheel), and a road-surface friction coefficient μ.

Based on these input signals, the driving force control device 1 calculates an appropriate driving force value in accordance with a driving force control program to be described hereinafter, and outputs the driving force value to an engine control unit 2. The engine control unit 2 outputs a control signal to a throttle control unit (not shown) so as to allow a motor to be driven, whereby a throttle value is actuated.

As shown in FIG. 1, the driving force control device 1 mainly includes an engine-torque calculating portion 1a, a requested-engine-torque calculating portion 1b, a transmission-output-torque calculating portion 1c, a total-driving-force calculating portion 1d, a front-rear ground-load calculating portion 1e, a left-wheel load-ratio calculating portion 1f, an individual-wheel ground-load calculating portion 1g, an individual-wheel longitudinal-force calculating portion 1h, an individual-wheel requested-lateral-force calculating portion 1i, an individual-wheel lateral-force calculating portion 1j, an individual-wheel friction-circle limit-value calculating portion 1k, an individual-wheel requested-resultant-tire-force calculating portion 1l, an individual-wheel resultant-tire-force calculating portion 1m, an individual-wheel requested-excessive-tire-force calculating portion 1n, an individual-wheel excessive-tire-force calculating portion 1o, an excessive-tire-force calculating portion 1p, an over-torque calculating portion 1q, and a control-amount calculating portion 1r.

The engine-torque calculating portion 1a receives a throttle opening $\theta_{th}$ from the throttle-opening sensor 1l and an engine speed $N_e$ from the engine-speed sensor 12. The engine-torque calculating portion 1a refers to a map (such as the map shown in FIG. 4) preliminarily set based on engine characteristics so as to determine an engine torque $T_{eg}$ currently being generated. The engine-torque calculating portion 1a then outputs the determined engine torque $T_{eg}$ to the transmission-output-torque calculating portion 1c. The engine torque $T_{eg}$ may alternatively be read from the engine control unit 2.

The requested-engine-torque calculating portion 1b receives an accelerator opening $\theta_{ACC}$ from the accelerator-opening sensor 13 (or accelerator opening detecting means), and determines a throttle opening $\theta_{th}$ from a preliminarily set map (such as the map in FIG. 5 showing a relationship between $\theta_{ACC}$ and $\theta_{th}$). Based on the throttle opening $\theta_{th}$, the requested-engine-torque calculating portion 1b determines an engine torque $T_{eg}$ from the aforementioned map in FIG. 4, and outputs the determined engine torque $T_{eg}$ as a requested engine torque $T_{drv}$ to the control-amount calculating portion 1r. The requested engine torque $T_{drv}$ may alternatively be determined from a map in accordance with a preliminarily set accelerator opening $\theta_{ACC}$, or may be read from the engine control unit 2.

The transmission-output-torque calculating portion 1c receives the engine speed $N_e$ from the engine-speed sensor 12, a main transmission gear ratio i and a turbine speed $N_t$ of a torque converter from the transmission control unit 14, and the engine torque $T_{eg}$ from the engine-torque calculating portion 1a.

The transmission-output-torque calculating portion 1c calculates a transmission output torque $T_t$ from, for example, the following expression (1) and outputs the calculated transmission output torque $T_t$ to the total-driving-force calculating portion 1d and the individual-wheel longitudinal-force calculating portion 1h.

$$T_t = T_{eg} \cdot t \cdot i \tag{1}$$

In this case, t indicates a torque ratio of the torque converter and is determined by referring to a preliminarily set map indicating a relationship between a rotational speed ratio e ($=N_t/N_e$) of the torque converter and a torque ratio of the torque converter.

The total-driving-force calculating portion 1d receives the transmission output torque $T_t$ from the transmission-output-torque calculating portion 1c.

The total-driving-force calculating portion 1d calculates a total driving force $F_x$ from, for example, the following expression (2) and outputs the calculated total driving force $F_x$ to the front-rear ground-load calculating portion 1e and the individual-wheel longitudinal-force calculating portion 1h.

$$F_x = T_t \cdot \eta \cdot i_f / R_t \tag{2}$$

In this case, η indicates a transmission efficiency of a driving system, $i_f$ indicates a final gear ratio, and $R_t$ indicates a tire radius.

The front-rear ground-load calculating portion 1e receives the total driving force $F_x$ from the total-driving-force calculating portion 1d. The front-rear ground-load calculating portion 1e then calculates a front-wheel ground load $F_{zf}$ from the following expression (3) and outputs the calculated front-wheel ground load $F_{zf}$ to the individual-wheel ground-load calculating portion 1g and the individual-wheel longitudinal-force calculating portion 1h. In addition, the front-rear ground-load calculating portion 1e calculates a rear-wheel ground load $F_{zr}$ from the following expression (4) and outputs the calculated rear-wheel ground load $F_{zr}$ to the individual-wheel ground-load calculating portion 1g.

$$F_{zf} = W_f - ((m \cdot (d^2x/dt^2) \cdot h)/L) \tag{3}$$

$$F_{zr} = W - F_{zf} \tag{4}$$

In this case, $W_f$ indicates a front-wheel static load, m indicates a vehicle mass, ($d^2x/dt^2$) indicates a longitudinal acceleration ($=F_x/m$), h indicates the height of gravitational center, L indicates a wheel base, and W indicates a vehicle mass ($=m \cdot G$; G being a gravitational acceleration).

The left-wheel load-ratio calculating portion 1f receives a lateral acceleration ($d^2y/dt^2$) from the lateral-acceleration sensor 15. The left-wheel load-ratio calculating portion 1f calculates a left-wheel load-ratio $WR_{\_l}$ from the following expression (5) and outputs the calculated left-wheel load-ratio $WR_{\_l}$ to the individual-wheel ground-load calculating portion 1g, the individual-wheel requested-lateral-force calculating portion 1i, and the individual-wheel lateral-force calculating portion 1j.

$$WR_{\_l} = 0.5 - ((d^2y/dt^2)/G) \cdot (h/L_{tred}) \tag{5}$$

In this case, $L_{tred}$ indicates an average tread value between the front and rear wheels.

The individual-wheel ground-load calculating portion 1g receives the front-wheel ground load $F_{zf}$ and the rear-wheel ground load $F_{zr}$ from the front-rear ground-load calculating portion 1e, and also receives the left-wheel load-ratio $WR_{\_l}$ from the left-wheel load-ratio calculating portion 1f. The individual-wheel ground-load calculating portion 1g calculates a front-left-wheel ground load $F_{zf\_l}$, a front-right-wheel ground load $F_{zf\_r}$, a rear-left-wheel ground load $F_{zr\_l}$, and a rear-right-wheel ground load $F_{zr\_r}$ from the following expressions (6), (7), (8), and (9), respectively, and outputs these calculated values to the individual-wheel friction-circle limit-value calculating portion 1k.

$$F_{zf\_l} = F_{zf} \cdot WR_{\_l} \tag{6}$$

$$F_{zf\_r} = F_{zf} \cdot (1 - WR_{\_l}) \tag{7}$$

$$F_{zr\_l} = F_{zr} \cdot WR_{\_l} \tag{8}$$

$$F_{zr\_r} = F_{zr} \cdot (1 - WR_{\_l}) \tag{9}$$

The individual-wheel longitudinal-force calculating portion 1h receives a tightening torque $T_{LSD}$ of the limited-slip differential clutch in the center differential from the transmission control unit 14, the transmission output torque $T_t$ from the transmission-output-torque calculating portion 1c, the total driving force $F_x$ from the total-driving-force calculating portion 1d, and the front-wheel ground load $R_{zf}$ from the front-rear ground-load calculating portion 1e. In accordance with a procedure to be described hereinafter, the individual-wheel longitudinal-force calculating portion 1h calculates a front-left-wheel longitudinal force $F_{xf\_l}$, a front-right-wheel longitudinal force $F_{xf\_r}$, a rear-left-wheel longitudinal force $F_{xr\_l}$, and a rear-right-wheel longitudinal force $F_{xr\_r}$, and outputs these calculated values to the individual-wheel requested-resultant-tire-force calculating portion 1l and the individual-wheel resultant-tire-force calculating portion 1m.

An example of the procedure for calculating the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ will be described below.

First, a front-wheel load distribution rate $W_{R\_f}$ is calculated from the following expression (10):

$$W_{R\_f} = F_{zf}/W \tag{10}$$

Then, a minimum front-wheel longitudinal torque $T_{fmin}$ and a maximum front-wheel longitudinal torque $T_{fmax}$ are calculated from the following expressions (11) and (12):

$$T_{fmin} = T_t \cdot R_{f\_cd} - T_{LSD} (\geqq 0) \tag{11}$$

$$T_{fmax} = T_t \cdot R_{f\_cd} + T_{LSD} (\geqq 0) \tag{12}$$

Subsequently, a minimum front-wheel longitudinal force $F_{xfmin}$ and a maximum front-wheel longitudinal force $F_{xfmax}$ are calculated from the following expressions (13) and (14):

$$F_{xfmin} = T_{fmin} \cdot \eta \cdot i_f / R_t \tag{13}$$

$$F_{xfmax} = T_{fmax} \cdot \eta \cdot i_f / R_t \tag{14}$$

Next, a determination value I is set in the following manner.

When $W_{R\_f} \leqq F_{xfmin}/F_x$, it is determined that limited-slip differential torque is increasing at the rear wheels, thereby setting the determination value I to 1.

When $W_{R\_f} \geqq F_{xfmax}/F_x$, it is determined that limited-slip differential torque is increasing at the front wheels, thereby setting the determination value I to 3.

In cases other than the above, a normal condition is confirmed, thereby setting the determination value I to 2.

In accordance with the determination value I, a front-wheel longitudinal force $F_{xf}$ is calculated as follows:

When I=1: $F_{xf} = T_{fmin} \cdot \eta \cdot i_f / R_t$ (15)

When I=2: $F_{xf} = F_x \cdot W_{R\_f}$ (16)

When I=3: $F_{xf} = F_{xfmax} \cdot \eta \cdot i_f / R_t$ (17)

Based on the front-wheel longitudinal force $F_{xf}$ calculated from the expression (15), (16), or (17), a rear-wheel longitudinal force $F_{xr}$ is calculated from the following expression (18):

$$F_{xr} = F_x - F_{xf} \tag{18}$$

Using the front-wheel longitudinal force $F_{xf}$ and the rear-wheel longitudinal force $F_{xr}$, the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ are calculated from the following expressions (19) to (22):

$$F_{xf\_l}=F_{xf}/2 \quad (19)$$

$$F_{xf\_r}=F_{xf\_l} \quad (20)$$

$$F_{xr\_l}=F_{xr}/2 \quad (21)$$

$$F_{xr\_r}=F_{xr\_l} \quad (22)$$

The calculations of the longitudinal forces of the individual wheels described above in the first embodiment are simply examples, and are appropriately selectable according to the driving method or driving mechanism of the vehicle.

The individual-wheel requested-lateral-force calculating portion 1*i* receives the lateral acceleration ($d^2y/dt^2$) from the lateral-acceleration sensor 15, a yaw rate $\gamma$ from the yaw-rate sensor 16, a steering-wheel angle $\theta_H$ from the steering-wheel-angle sensor 17, wheel speeds $\omega_{fl}$, $\omega_{fr}$, $\omega_{rl}$, and $\omega_{rr}$ of the four wheels from the wheel-speed sensors 18 for the respective (four) wheels, and the left-wheel load-ratio $WR_{\_l}$ from the left-wheel load-ratio calculating portion 1*f*.

In accordance with a procedure to be described below (i.e. the flow chart shown in FIG. 6), an additional yaw moment $M_z\theta$ is calculated. Based on this additional yaw moment, a requested front-wheel lateral force $F_{yf\_FF}$ is calculated from the following expression (23), and a requested rear-wheel lateral force $F_{yr\_FF}$ is calculated from the following expression (24). Based on the requested front-wheel lateral force $F_{yf\_FF}$ and the requested rear-wheel lateral force $F_{yr\_FF}$, a front-left-wheel requested lateral force $F_{yf\_l\_FF}$, a front-right-wheel requested lateral force $F_{yf\_r\_FF}$, a rear-left-wheel requested lateral force $F_{yr\_l\_FF}$, and a rear-right-wheel requested lateral force $F_{yr\_r\_FF}$ are calculated from the following expressions (25) to (28) and are output to the individual-wheel requested-resultant-tire-force calculating portion 11.

$$F_{yf\_FF}=M_z\theta/L \quad (23)$$

$$F_{yr\_FF}=(-I_z\cdot(d\gamma/dt)+m\cdot(d^2y/dt^2)*L_f)/L \quad (24)$$

In this case, $I_z$ indicates a yaw moment of inertia of the vehicle, and $L_f$ indicates a distance between the front axle and the center of gravity.

$$F_{yf\_l\_FF}=F_{yf\_FF}\cdot WR_{\_l} \quad (25)$$

$$F_{yf\_r\_FF}=F_{yf\_FF}\cdot(1-WR_{\_l}) \quad (26)$$

$$F_{yr\_l\_FF}=F_{yr\_FF}\cdot WR_{\_l} \quad (27)$$

$$F_{yr\_r\_FF}=F_{yr\_FF}\cdot(1-WR_{\_l}) \quad (28)$$

Next, As shown in FIG. 6, the additional yaw moment $M_z\theta$ is determined. First, a vehicle speed V is calculated in step S201 (e.g. $V=(\omega_{fl}+\omega_{fr}+\omega_{rl}+\omega_{rr})/4$) and then a lateral-acceleration/steering-wheel-angle gain $G_y$ is calculated in step S202 using the following expression (29):

$$G_y=(1/(1+A\cdot V^2))(V^2/L)\cdot(1/n) \quad (29)$$

In this case, A indicates a stability factor, and n indicates a steering gear ratio.

The process then proceeds to step S203, which is a step for referring to a map preliminarily set in accordance with a value ($G_y\cdot\theta_H$) obtained by multiplying the lateral-acceleration/steering-wheel-angle gain $G_y$ by the steering-wheel angle $\theta_H$ and the lateral acceleration ($d^2y/dt^2$) so as to calculate a lateral-acceleration saturation coefficient K$\mu$. Referring to FIG. 7A, this map used for determining a lateral-acceleration saturation coefficient K$\mu$ is preliminarily set in accordance with a value ($G_y\cdot\theta_H$) obtained by multiplying the lateral-acceleration/steering-wheel-angle gain $G_y$ by the steering-wheel angle $\theta_H$ and the lateral acceleration ($d^2y/dt^2$), and decreases with increasing lateral acceleration ($d^2y/dt^2$) in a state where the steering-wheel angle $\theta_H$ is greater than or equal to a predetermined value. This implies that when the $G_y\cdot\theta_H$ is a large value, the lateral acceleration ($d^2y/dt^2$) becomes greater towards a higher $\mu$ road, but the lateral acceleration ($d^2y/dt^2$) is less likely to occur on a low $\mu$ road. Consequently, referring to FIG. 7B, a reference lateral acceleration ($d^2yr/dt^2$) to be described hereinafter is set to a low value in the case where the vehicle is considered to be on a high $\mu$ road based on the $G_y\cdot\theta_H$ being a large value and the lateral acceleration ($d^2y/dt^2$) being a large value, so that the correction amount with respect to the additional yaw moment $M_z\theta$ is set to a small amount.

In step S204, a lateral-acceleration deviation feedback gain $K_y$ is calculated from the following expression (30):

$$K_y=K\theta/G_y \quad (30)$$

In this case, K$\theta$ indicates a steering-angle feedback gain, which is calculated from the following expression (31):

$$K\theta=(L_f\cdot K_f)/n \quad (31)$$

Here, $K_f$ indicates an equivalent cornering power of the front axle.

Specifically, the lateral-acceleration deviation feedback gain $K_y$ is determined from the expression (30) as a target value (maximum value) in view of the case where the additional yaw moment $M_z\theta$ (stationary value) becomes zero in a state where the steering is absolutely ineffective ($\gamma=0$, ($d^2y/dt^2$)=0) on a significantly low $\mu$ road.

Subsequently, in step S205, a reference lateral acceleration ($d^2yr/dt^2$) is calculated from the following expression (32):

$$(d^2yr/dt^2)=K\mu\cdot G_y\cdot(1/(1+T_y\cdot s))\cdot\theta_H \quad (32)$$

In this case, s indicates a differential operator, and $T_y$ indicates a first-order-lag time constant of lateral acceleration. This first-order-lag time constant $T_y$ is calculated from, for example, the following expression (33) with an equivalent cornering power of the rear axle indicated by $K_r$:

$$T_y=I_z/(L\cdot K_r) \quad (33)$$

In step S206, a lateral-acceleration deviation ($d^2ye/dt^2$) is calculated from the following expression (34):

$$(d^2ye/dt^2)=(d^2y/dt^2)=(d^2yr/dt^2) \quad (34)$$

Subsequently, in step S207, a yaw-rate/steering-wheel-angle gain G$\gamma$ is calculated from the following expression (35):

$$G\gamma=(1/(1+A\cdot V^2))\cdot(V/L)\cdot(1/n) \quad (35)$$

In step S208, a yaw-rate feedback gain K$\gamma$ is calculated from the following expression (36) in view of the case where, for example, the additional yaw moment $M_z\theta$ (stationary value) becomes zero at the time of grip driving (when ($d^2ye/dt^2$)=0).

$$K\gamma=K\theta/G\gamma \quad (36)$$

In step S209, a vehicle-speed feedback gain $K_v$ is calculated on the basis of a preliminarily set map. This map is set so as to avoid an undesired additional yaw moment $M_z\theta$ in a low speed range, as shown in, for example, FIG. 8. In FIG. 8, $V_{cl}$ represents, for example, 40 km/h.

In step S210, an additional yaw moment $M_z\theta$ is calculated from the following expression (37):

$$M_z\theta = K_v \cdot (-K\gamma \cdot \gamma + K_y \cdot (d^2ye/dt^2) + K\theta \cdot \theta_H) \tag{37}$$

As shown in expression (37), the term $-K\gamma \cdot \gamma$ corresponds to a yaw moment responding to a yaw rate $\gamma$, the term $K\theta \cdot \theta_H$ corresponds to a yaw moment responding to a steering-wheel angle $\theta_H$, and the term $K_y \cdot (d^2ye/dt^2)$ corresponds to a correction value of the yaw moment. Therefore, when the vehicle is driven with a large lateral acceleration $(d^2y/dt^2)$ on a high $\mu$ road as shown in FIG. 9, the additional yaw moment $M_z\theta$ also becomes a large value, thereby enhancing the driving performance. On the other hand, when the vehicle is driven on a low $\mu$ road, the additional yaw moment $M_z\theta$ is prevented from increasing since the additional yaw moment $M_z\theta$ is reduced due to the effect of the correction value, thereby allowing for stable driving performance.

The individual-wheel lateral-force calculating portion 1j receives the lateral acceleration $(d^2y/dt^2)$ from the lateral-acceleration sensor 15, the yaw rate $\gamma$ from the yaw-rate sensor 16, and the left-wheel load-ratio $WR_{\_l}$ from the left-wheel load-ratio calculating portion 1f. Then, the individual-wheel lateral-force calculating portion 1j calculates a front-wheel lateral force $F_{yf\_FB}$ and a rear-wheel lateral force $F_{yr\_FB}$ from the following expressions (38) and (39), respectively. Based on the front-wheel lateral force $F_{yf\_FB}$ and the rear-wheel lateral force $F_{yr\_FB}$, the individual-wheel lateral-force calculating portion 1j calculates a front-left-wheel lateral force $F_{yf\_l\_FB}$, a front-right-wheel lateral force $F_{yf\_r\_FB}$, a rear-left-wheel lateral force $F_{yr\_l\_FB}$, and a rear-right-wheel lateral force $F_{yr\_r\_FB}$ from the following expressions (40) to (43), and outputs these calculated values to the individual-wheel resultant-tire-force calculating portion 1m.

$$F_{yf\_FB} = (I_z \cdot (d\gamma/dt) + m \cdot (d^2y/dt^2) \cdot L_r)/L \tag{38}$$

$$F_{yr\_FB} = (-I_z \cdot (d\gamma/dt) + m \cdot (d^2y/dt^2) \cdot L_f)/L \tag{39}$$

Here, $L_r$ indicates a distance between the rear axle and the center of gravity.

$$F_{yf\_l\_FB} = F_{yf\_FB} \cdot WR_{\_l} \tag{40}$$

$$F_{yf\_r\_FB} = F_{yf\_FB} \cdot (1 - WR_{\_l}) \tag{41}$$

$$F_{yr\_l\_FB} = F_{yr\_FB} \cdot WR_{\_l} \tag{42}$$

$$F_{yr\_r\_FB} = F_{yr\_FB} \cdot (1 - WR_{\_l}) \tag{43}$$

The individual-wheel friction-circle limit-value calculating portion 1k receives a road-surface friction coefficient $\mu$ from the road-surface $\mu$ estimation unit 19, and the front-left-wheel ground load $R_{zf\_l}$, the front-right-wheel ground load $F_{zf\_r}$, the rear-left-wheel ground load $F_{zr\_l}$, and the rear-right-wheel ground load $F_{zr\_r}$ from the individual-wheel ground-load calculating portion 1g.

The individual-wheel friction-circle limit-value calculating portion 1k then calculates a front-left-wheel friction-circle limit-value $\mu\_F_{zfl}$, a front-right-wheel friction-circle limit-value $\mu\_F_{zfr}$, a rear-left-wheel friction-circle limit-value $\mu\_F_{zrl}$, and a rear-right-wheel friction-circle limit-value $\mu\_F_{zrr}$ from the following expressions (44) to (47), and outputs the calculated values to the individual-wheel requested-excessive-tire-force calculating portion 1n and the individual-wheel excessive-tire-force calculating portion 1o. In other words, the individual-wheel friction-circle limit-value calculating portion 1k is provided as friction-circle limit-value setting means.

$$\mu\_F_{zfl} = \mu \cdot F_{zf\_l} \tag{44}$$

$$\mu\_F_{zfr} = \mu \cdot F_{zf\_r} \tag{45}$$

$$\mu\_F_{zrl} = \mu \cdot F_{zr\_l} \tag{46}$$

$$\mu\_F_{zrr} = \mu \cdot F_{zr\_r} \tag{47}$$

The individual-wheel requested-resultant-tire-force calculating portion 1l receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 1h, and also receives the front-left-wheel requested lateral force $F_{yf\_l\_FF}$, the front-right-wheel requested lateral force $F_{yf\_r\_FF}$, the rear-left-wheel requested lateral force $F_{yr\_l\_FF}$, and the rear-right-wheel requested lateral force $F_{yr\_r\_FF}$ from the individual-wheel requested-lateral-force calculating portion 1i. The individual-wheel requested-resultant-tire-force calculating portion 1l calculates a front-left-wheel requested resultant tire force $F_{\_fl\_FF}$, a front-right-wheel requested resultant tire force $F_{\_fr\_FF}$, a rear-left-wheel requested resultant tire force $F_{\_rl\_FF}$, and a rear-right-wheel requested resultant tire force $F_{\_rr\_FF}$ from the following expressions (48) to (51), and outputs these calculated values to the individual-wheel requested-excessive-tire-force calculating portion 1n. In other words, the individual-wheel requested-resultant-tire-force calculating portion 1l is provided as first-tire-force estimating means.

$$F_{\_fl\_FF} = (F_{xf\_l}^2 + F_{yf\_l\_FF}^2)^{1/2} \tag{48}$$

$$F_{\_fr\_FF} = (F_{xf\_r}^2 + F_{yf\_r\_FF}^2)^{1/2} \tag{49}$$

$$F_{\_rl\_FF} = (F_{xr\_l}^2 + F_{yr\_l\_FF}^2)^{1/2} \tag{50}$$

$$F_{\_rr\_FF} = (F_{xr\_r}^2 + F_{yr\_r\_FF}^2)^{1/2} \tag{51}$$

The individual-wheel resultant-tire-force calculating portion 1m receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 1h, and also receives the front-left-wheel lateral force $F_{yf\_l\_FB}$, the front-right-wheel lateral force $F_{yf\_r\_FB}$, the rear-left-wheel lateral force $F_{yr\_l\_FB}$, and the rear-right-wheel lateral force $F_{yr\_r\_FB}$ from the individual-wheel lateral-force calculating portion 1j. The individual-wheel resultant-tire-force calculating portion 1m calculates a front-left-wheel resultant tire force $F_{\_fl\_FB}$, a front-right-wheel resultant tire force $F_{\_fr\_FB}$, a rear-left-wheel resultant tire force $F_{\_rl\_FB}$, and a rear-right-wheel resultant tire force $F_{\_rr\_FB}$ from the following expressions (52) to (55), and outputs these calculated values to the individual-wheel excessive-tire-force calculating portion 1o. In other words, the individual-wheel resultant-tire-force calculating portion 1m is provided as second-tire-force estimating means.

$$F_{\_fl\_FB} = (F_{xf\_l}^2 + F_{yf\_l\_FB}^2)^{1/2} \tag{52}$$

$$F_{\_fr\_FB} = (F_{xf\_r}^2 + F_{yf\_r\_FB}^2)^{1/2} \tag{53}$$

$$F_{\_rl\_FB} = (F_{xr\_l}^2 + F_{yr\_l\_FB}^2)^{1/2} \tag{54}$$

$$F_{\_rr\_FB} = (F_{xr\_r}^2 + F_{yr\_r\_FB}^2)^{1/2} \tag{55}$$

The individual-wheel requested-excessive-tire-force calculating portion 1n receives the front-left-wheel friction-circle limit-value μ_$F_{zfl}$, the front-right-wheel friction-circle limit-value μ_$F_{zfr}$, the rear-left-wheel friction-circle limit-value μ_$F_{zrl}$, and the rear-right-wheel friction-circle limit-value μ_$F_{zrr}$ from the individual-wheel friction-circle limit-value calculating portion 1k, and also receives the front-left-wheel requested resultant tire force $F_{\_fl\_FB}$, the front-right-wheel requested resultant tire force $F_{\_fr\_FB}$, the rear-left-wheel requested resultant tire force $F_{\_rl\_FB}$, and the rear-right-wheel requested resultant tire force $F_{\_rr\_FB}$ from the individual-wheel requested-resultant-tire-force calculating portion 1l. The individual-wheel requested-excessive-tire-force calculating portion 11n then calculates a front-left-wheel requested excessive tire force $\Delta F_{\_fl\_FB}$, a front-right-wheel requested excessive tire force $\Delta F_{\_fr\_FB}$, a rear-left-wheel requested excessive tire force $\Delta F_{\_rl\_FF}$, and a rear-right-wheel requested excessive tire force $\Delta F_{\_rr\_FF}$ from the following expressions (56) to (59), and outputs these calculated values to the excessive-tire-force calculating portion 1p. In other words, the individual-wheel requested-excessive-tire-force calculating portion 1n is provided as first-excessive-tire-force estimating means.

$$\Delta F_{\_fl\_FF} = F_{\_fl\_FF} - \mu\_F_{zfl} \quad (56)$$

$$\Delta F_{\_fr\_FF} = F_{\_fr\_FF} - \mu\_F_{zfr} \quad (57)$$

$$\Delta F_{\_rl\_FF} = F_{\_rl\_FF} - \mu\_F_{zrl} \quad (58)$$

$$\Delta F_{\_rr\_FF} = F_{\_rr\_FF} - \mu\_F_{zrr} \quad (59)$$

The individual-wheel excessive-tire-force calculating portion 1o receives the front-left-wheel friction-circle limit-value μ_$F_{zfl}$, the front-right-wheel friction-circle limit-value μ_$F_{zfr}$, the rear-left-wheel friction-circle limit-value μ_$F_{zrl}$, and the rear-right-wheel friction-circle limit-value μ_$F_{zrr}$ from the individual-wheel friction-circle limit-value calculating portion 1k, and also receives the front-left-wheel resultant tire force $F_{\_fl\_FB}$, the front-right-wheel resultant tire force $F_{\_fr\_FB}$, the rear-left-wheel resultant tire force $F_{\_rl\_FB}$, and the rear-right-wheel resultant tire force $F_{\_rr\_FB}$ from the individual-wheel resultant-tire-force calculating portion 1m. The individual-wheel excessive-tire-force calculating portion 1o then calculates a front-left-wheel excessive tire force $\Delta F_{\_fl\_Fb}$, a front-right-wheel excessive tire force $\Delta F_{\_fr\_FB}$, a rear-left-wheel excessive tire force $\Delta F_{\_rl\_FB}$, and a rear-right-wheel excessive tire force $\Delta F_{\_rr\_FB}$ from the following expressions (60) to (63), and outputs these calculated values to the excessive-tire-force calculating portion 1p. In other words, the individual-wheel excessive-tire-force calculating portion 1o is provided as second-excessive-tire-force estimating means.

$$\Delta F_{\_fl\_FB} = F_{\_fl\_FB} - \mu\_F_{zfl} \quad (60)$$

$$\Delta F_{\_fr\_FB} = F_{\_fr\_FB} - \mu\_F_{zfr} \quad (61)$$

$$\Delta F_{\_rl\_FB} = F_{\_rl\_FB} - \mu\_F_{zrl} \quad (62)$$

$$\Delta F_{\_rr\_FB} = F_{\_rr\_FB} - \mu\_F_{zrr} \quad (63)$$

The excessive-tire-force calculating portion 1p receives the front-left-wheel requested excessive tire force $\Delta F_{\_fl\_FF}$, the front-right-wheel requested excessive tire force $\Delta F_{\_fr\_FF}$, the rear-left-wheel requested excessive tire force $\Delta F_{\_rl\_FF}$, and the rear-right-wheel requested excessive tire force $\Delta F_{\_rr\_FF}$ from the individual-wheel requested-excessive-tire-force calculating portion 1n, and also receives the front-left-wheel excessive tire force $\Delta F_{\_fl\_FB}$, the front-right-wheel excessive tire force $\Delta F_{\_fr\_FB}$, the rear-left-wheel excessive tire force $\Delta F_{\_rl\_FB}$, and the rear-right-wheel excessive tire force $\Delta F_{\_rr\_FB}$ from the individual-wheel excessive-tire-force calculating portion 1o. The excessive-tire-force calculating portion 1p then compares a total value of the requested excessive tire forces $\Delta F_{\_fl\_FF}$, $\Delta F_{\_fr\_FF}$, $\Delta F_{\_rl\_FF}$, and $\Delta F_{\_rr\_FF}$ with a total value of the excessive tire forces $\Delta F_{\_fl\_FB}$, $\Delta F_{\_fr\_FB}$, $\Delta F_{\_rl\_FB}$ and $\Delta F_{\_rr\_FB}$, and sets the larger one of the two values as an excessive tire force $F_{over}$.

$$F_{over} = \text{MAX}((\Delta F_{\_fl\_FF} + \Delta F_{\_fr\_FF} + \Delta F_{\_rl\_FF} + \Delta F_{\_rr\_FF}), (\Delta F_{\_fl\_FB} + \Delta F_{\_fr\_FB} + \Delta F_{\_rl\_FB} + \Delta F_{\_rr\_FB})) \quad (64)$$

The over-torque calculating portion 1q receives the engine speed $N_e$ from the engine-speed sensor 12, the main transmission gear ratio i and the turbine speed $N_t$ of the torque converter from the transmission control unit 14, and the excessive tire force $F_{over}$ from the excessive-tire-force calculating portion 1p. The over-torque calculating portion 1q calculates an over-torque $T_{over}$ from the following expression (65), and outputs the calculated value to the control-amount calculating portion 1r.

$$T_{over} = F_{over} \cdot R_t / t / i / \eta / i_f \quad (65)$$

The control-amount calculating portion 1r receives the requested engine torque $T_{drv}$ from the requested-engine-torque calculating portion 1b, and also receives the over-torque $T_{over}$ from the over-torque calculating portion 1q. The control-amount calculating portion 1r calculates a control amount $T_{req}$ from the following expression (66) and outputs the calculated value to the engine control unit 2.

$$T_{req} = T_{drv} - T_{over} \quad (66)$$

Accordingly, in the first embodiment, the excessive-tire-force calculating portion 1p, the over-torque calculating portion 1q, and the control-amount calculating portion 1r constitute driving-force correcting means that corrects a driving force requested by a driver.

A driving force control program performed by the driving force control device 1 will now be described with reference to the flow charts shown in FIGS. 2 and 3.

In step S101, required parameters are read, which include a throttle opening $\theta_{th}$, an engine speed $N_e$, an accelerator opening $\theta_{ACC}$, a main transmission gear ratio i, a turbine speed $N_t$ of a torque converter, a tightening torque $T_{LSD}$ of a limited-slip differential clutch, a lateral acceleration ($d^2y/dt^2$), a yaw rate γ, a steering-wheel angle $\theta_H$, wheel speeds $\omega_{fl}$, $\omega_{fr}$, $\omega_{rl}$, and $\omega_{rr}$ of the individual wheels, and a road-surface friction coefficient μ.

In step S102, the engine-torque calculating portion 1a refers to a map (such as the map shown in FIG. 4) preliminarily set based on engine characteristics so as to determine an engine torque $T_{eg}$ currently being generated.

In step S103, the requested-engine-torque calculating portion 1b determines a throttle opening $\theta_{th}$ from a preliminarily set map (such as the map in FIG. 5 showing a relationship between $\theta_{ACC}$ and $\theta_{th}$). Based on the throttle opening $\theta_{th}$, the requested-engine-torque calculating portion 1b determines an engine torque $T_{eg}$ as a requested engine torque $T_{drv}$ from the aforementioned map in FIG. 4.

In step S104, the transmission-output-torque calculating portion 1c calculates a transmission output torque $T_t$ from the aforementioned expression (1).

In step S105, the total-driving-force calculating portion 1d calculates a total driving force $F_x$ from the aforementioned expression (2).

In step S106, the front-rear ground-load calculating portion 1e calculates a front-wheel ground load $F_{zf}$ from the aforementioned expression (3) and a rear-wheel ground load $F_{zr}$ from the aforementioned expression (4).

In step S107, the left-wheel load-ratio calculating portion 1f calculates a left-wheel load-ratio $WR\_l$ from the aforementioned expression (5).

In step S108, the individual-wheel ground-load calculating portion 1g calculates a front-left-wheel ground load $E_{zf\_l}$, a front-right-wheel ground load $F_{zf\_r}$, a rear-left-wheel ground load $F_{zr\_l}$, and a rear-right-wheel ground load $F_{zr\_r}$ from the aforementioned expressions (6), (7), (8), and (9), respectively.

In step S109, the individual-wheel longitudinal-force calculating portion 1h calculates a front-left-wheel longitudinal force $F_{xf\_l}$, a front-right-wheel longitudinal force $F_{xf\_r}$, a rear-left-wheel longitudinal force $F_{xr\_l}$, and a rear-right-wheel longitudinal force $F_{xr\_r}$ from the aforementioned expressions (19) to (22), respectively. Subsequently, in step S110, the individual-wheel requested-lateral-force calculating portion 1i calculates a front-left-wheel requested lateral force $F_{yf\_l\_FF}$, a front-right-wheel requested lateral force $F_{yf\_r\_FF}$, a rear-left-wheel requested lateral force $F_{yr\_l\_FF}$, and a rear-right-wheel requested lateral force $F_{yr\_r\_FF}$ from the aforementioned expressions (25) to (28), respectively.

In step S111, the individual-wheel lateral-force calculating portion 1j calculates a front-left-wheel lateral force $F_{yf\_l\_FB}$, a front-right-wheel lateral force $F_{yf\_r\_FB}$, a rear-left-wheel lateral force $F_{yr\_l\_FB}$, and a rear-right-wheel lateral force $F_{yr\_r\_FB}$ from the aforementioned expressions (40) to (43), respectively.

In step S112, the individual-wheel friction-circle limit-value calculating portion 1k calculates a front-left-wheel friction-circle limit-value $\mu\_F_{zfl}$, a front-right-wheel friction-circle limit-value $\mu\_F_{zfr}$, a rear-left-wheel friction-circle limit-value $\mu\_F_{zrl}$, and a rear-right-wheel friction-circle limit-value $\mu\_F_{zrr}$ from the aforementioned expressions (44) to (47), respectively.

In step S113, the individual-wheel requested-resultant-tire-force calculating portion 1l calculates a front-left-wheel requested resultant tire force $F_{\_fl\_FF}$, a front-right-wheel requested resultant tire force $F_{\_fr\_FF}$, a rear-left-wheel requested resultant tire force $F_{\_rl\_FF}$, and a rear-right-wheel requested resultant tire force $F_{\_rr\_FF}$ from the aforementioned expressions (48) to (51), respectively.

In step S114, the individual-wheel resultant-tire-force calculating portion 1m calculates a front-left-wheel resultant tire force $F_{\_fl\_FB}$, a front-right-wheel resultant tire force $F_{\_fr\_FB}$, a rear-left-wheel resultant tire force $F_{\_rl\_FB}$, and a rear-right-wheel resultant tire force $F_{\_rr\_FB}$ from the aforementioned expressions (52) to (55), respectively.

In step S115, the individual-wheel requested-excessive-tire-force calculating portion 1n calculates a front-left-wheel requested excessive tire force $\Delta F_{\_fl\_FF}$, a front-right-wheel requested excessive tire force $\Delta F_{\_fr\_FF}$, a rear-left-wheel requested excessive tire force $\Delta F_{\_rl\_FF}$, and a rear-right-wheel requested excessive tire force $\Delta F_{\_rr\_FF}$ from the aforementioned expressions (56) to (59), respectively.

In step S116, the individual-wheel excessive-tire-force calculating portion 1o calculates a front-left-wheel excessive tire force $\Delta F_{\_fl\_FB}$, a front-right-wheel resultant excessive tire force $\Delta F_{\_fr\_FF}$, a rear-left-wheel resultant excessive tire force $\Delta F_{\_rl\_FB}$, and a rear-right-wheel resultant excessive tire force $\Delta F_{\_rr}$ from the aforementioned expressions (60) to (63), respectively.

In step S117, the excessive-tire-force calculating portion 1p calculates an excessive tire force $F_{over}$ from the aforementioned expression (64).

In step S118, the over-torque calculating portion 1q calculates an over-torque $T_{over}$ from the aforementioned expression (65). In step S119, the control-amount calculating portion 1r calculates a control amount $T_{req}$ from the aforementioned expression (66) and outputs the calculated value to the engine control unit 2. Finally, this exits the program.

In the first embodiment of the present invention, a torque value at which a tire force to be generated on each wheel based on a request from the driver exceeds the friction-circle limit value is compared with a torque value at which a tire force currently being generated on the wheel exceeds the friction-circle limit value, and the driving force is corrected by subtracting the larger one of the two values from a driving force requested by the driver. Consequently, an over-torque condition can be appropriately corrected not only for the present but also for the future, whereby appropriate control against spinning and plowing can be implemented. Thus, the grip forces of the tires can be appropriately maintained, whereby the driving stability of the vehicle can be improved.

Since the correction value to be subtracted from the driving force requested by the driver is simply a torque value at which a tire force exceeds the friction-circle limit value, a sudden reduction of the driving force in the longitudinal direction is prevented. This prevents the driver from feeling awkward or from having a sense of dissatisfaction due to a lack of acceleration (i.e. the driving force is inhibited only by an amount $F_{xa}$ in FIG. 10).

Alternatively, the grip forces of the tires may be maintained by properly inhibiting the driving force in the longitudinal direction (namely, the driving force may be inhibited only by an amount $F_{xb}$ in FIG. 10). In that case, the control is realized by adding signal lines shown with dashed lines in FIG. 1, and by changing the calculations performed by the individual-wheel requested-excessive-tire-force calculating portion in and the individual-wheel excessive-tire-force calculating portion 1o in the following manner.

The individual-wheel requested-excessive-tire-force calculating portion in receives the front-left-wheel friction-circle limit-value $\mu\_F_{zfl}$, the front-right-wheel friction-circle limit-value $\mu\_F_{zfr}$, the rear-left-wheel friction-circle limit-value $\mu\_F_{zrl}$, and the rear-right-wheel friction-circle limit-value $\mu\_F_{zrr}$ from the individual-wheel friction-circle limit-value calculating portion 1k, receives the front-left-wheel requested lateral force $F_{yf\_l\_FF}$, the front-right-wheel requested lateral force $F_{yf\_r\_FF}$, the rear-left-wheel requested lateral force $F_{yr\_l\_FF}$, and the rear-right-wheel requested lateral force $F_{yr\_r\_FF}$ from the individual-wheel requested-lateral-force calculating portion 1i, and receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 1h.

The individual-wheel requested-excessive-tire-force calculating portion 1n calculates a front-left-wheel requested excessive tire force $\Delta F_{\_fl\_FF}$, a front-right-wheel requested excessive tire force $\Delta F_{\_fr\_FF}$, a rear-left-wheel requested excessive tire force $\Delta F_{\_rl\_FF}$, and a rear-right-wheel requested excessive tire force $\Delta F_{\_rr\_FF}$ from the following expressions (67) to (70), and outputs these calculated values to the excessive-tire-force calculating portion 1p.

$$\Delta F_{\_fl\_FF} = F_{xf\_l} - (\mu\_F_{zfl}^2 - F_{yf\_l\_FF}^2)^{1/2} \quad (67)$$

$$\Delta F_{\_fr\_FF} = F_{xf\_r} - (\mu\_F_{zfr}^2 - F_{yf\_r\_FF}^2)^{1/2} \quad (68)$$

$$\Delta F_{\_rl\_FF} = F_{xr\_r} - (\mu\_F_{zrl}^2 - F_{yr\_l\_FF}^2)^{1/2} \quad (69)$$

$$\Delta F_{\_rr\_FF} = F_{xr\_r} - (\mu\_F_{zrr}^2 - F_{yr\_r\_FF}^2)^{1/2} \quad (70)$$

The individual-wheel excessive-tire-force calculating portion 1o receives the front-left-wheel friction-circle limit-value $\mu\_F_{zfl}$, the front-right-wheel friction-circle limit-value $\mu\_F_{zfr}$, the rear-left-wheel friction-circle limit-value $\mu\_F_{zrl}$, and the rear-right-wheel friction-circle limit-value $\mu\_F_{zrr}$ from the individual-wheel friction-circle limit-value calculating portion 1k, receives the front-left-wheel lateral force $F_{yf\_l\_FB}$, the front-right-wheel lateral force $F_{yf\_r\_FB}$, the rear-left-wheel lateral force $F_{yr\_l\_FB}$, and the rear-right-wheel lateral force $F_{yr\_r\_FB}$ from the individual-wheel lateral-force calculating portion 1j, and receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 1h.

The individual-wheel excessive-tire-force calculating portion 1o then calculates a front-left-wheel excessive tire force $\Delta F_{\_fl\_FB}$, a front-right-wheel excessive tire force $\Delta F_{\_fr\_FB}$, a rear-left-wheel excessive tire force $\Delta F_{\_rl\_FB}$, and a rear-right-wheel excessive tire force $\Delta F_{\_rr\_FB}$ from the following expressions (71) to (74), and outputs these calculated values to the excessive-tire-force calculating portion 1p.

$$\Delta F_{\_fl\_FB} = F_{xf\_l} - (\mu\_F_{zfl}^2 - F_{yf\_l\_FB}^2)^{1/2} \quad (71)$$

$$\Delta F_{\_fr\_FB} = F_{xf\_r} - (\mu\_F_{zfr}^2 - F_{yf\_r\_FB}^2)^{1/2} \quad (72)$$

$$\Delta F_{\_rl\_FB} = F_{xr\_l} - (\mu\_F_{zrl}^2 - F_{yr\_l\_FB}^2)^{1/2} \quad (73)$$

$$\Delta F_{\_rr\_FB} = F_{xr\_r} - (\mu\_F_{zrr}^2 - F_{yr\_r\_FB}^2)^{1/2} \quad (74)$$

Second Embodiment

Figure 11B:
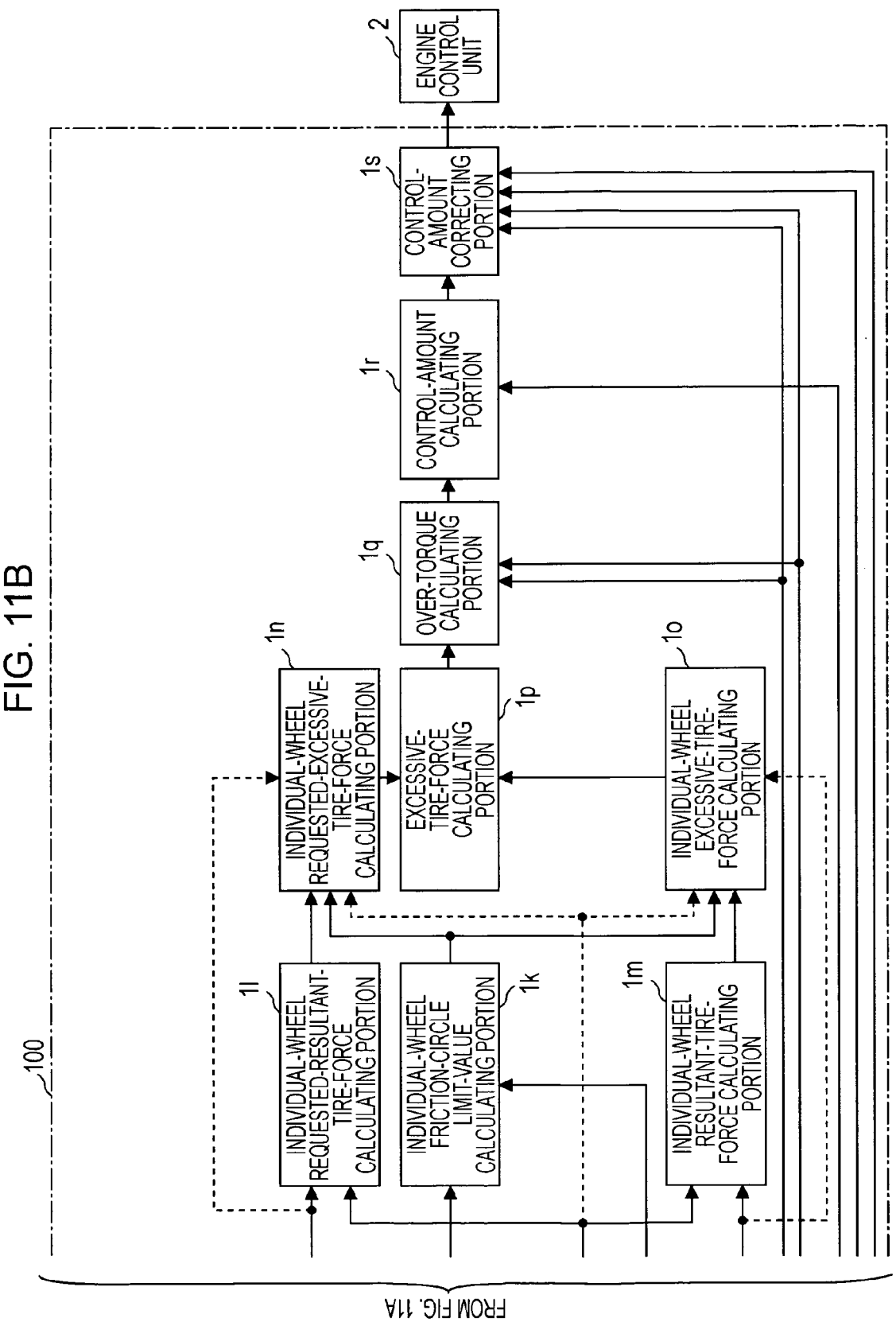
FIG. 11 is a functional block diagram of a driving force control device according to a second embodiment.
Figure 12:
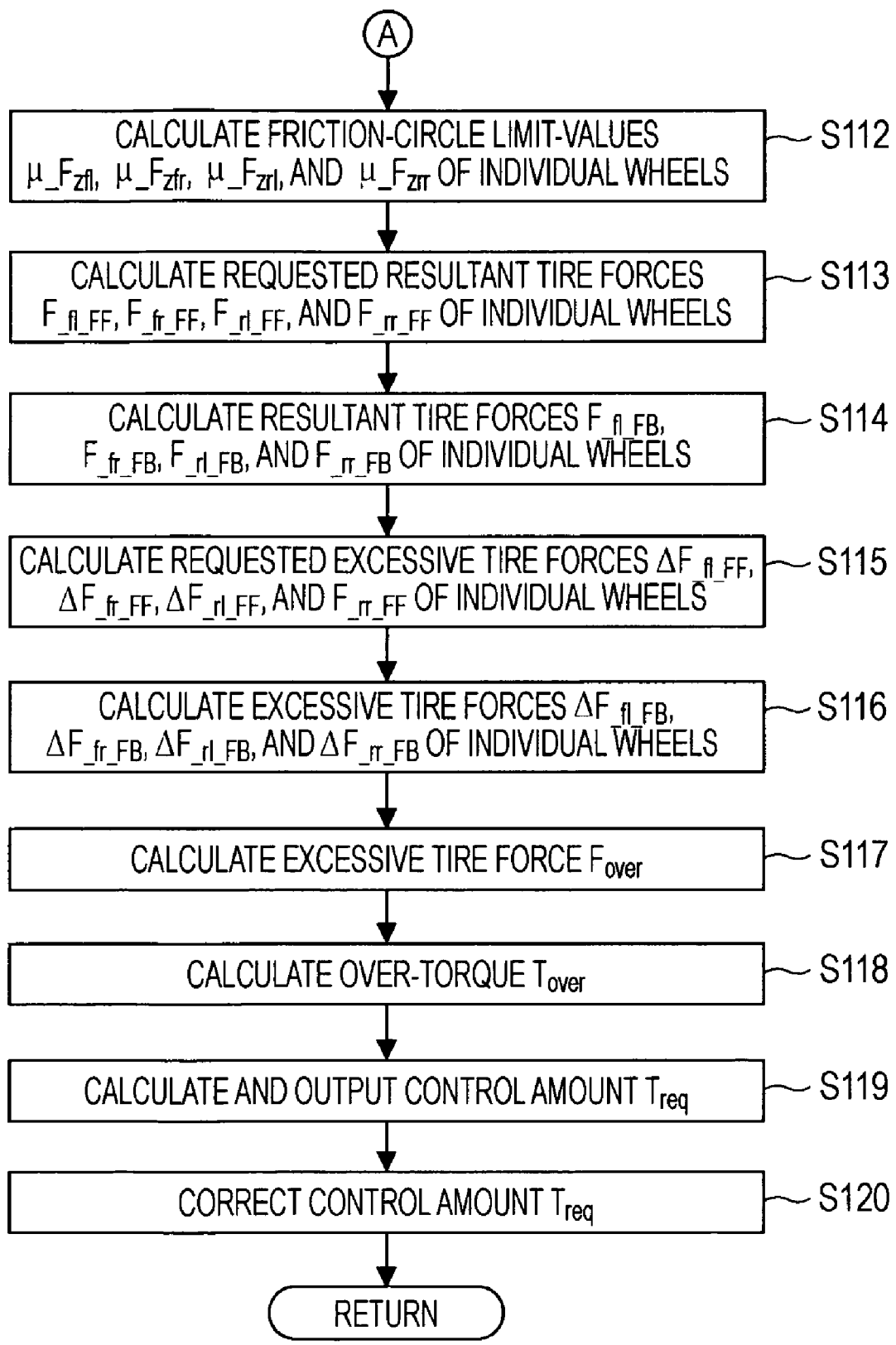
FIG. 12 is a flow chart of a driving force control program.
Figure 13:
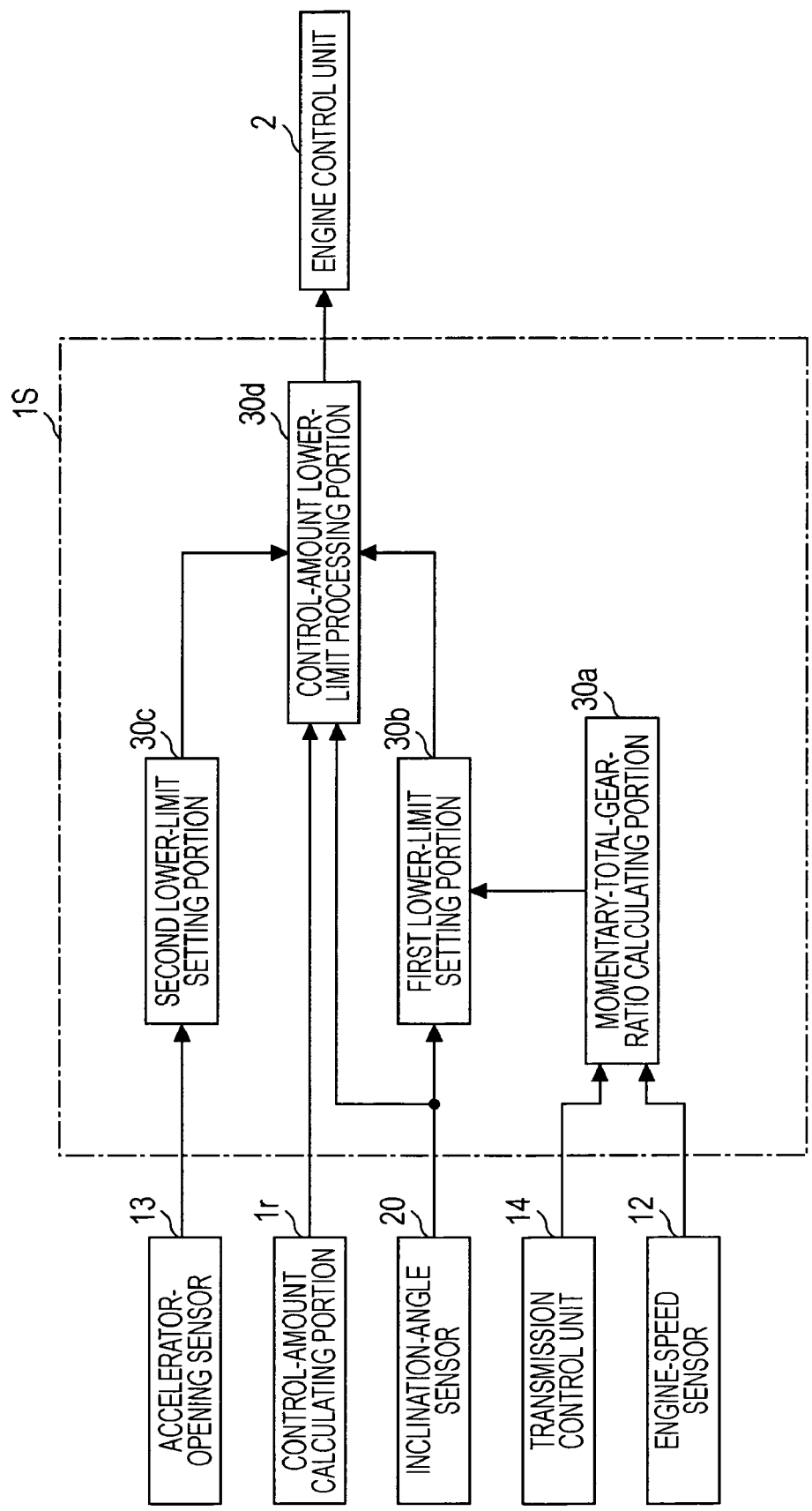
FIG. 13 is a functional block diagram of a control-amount correcting portion.
Figure 14:
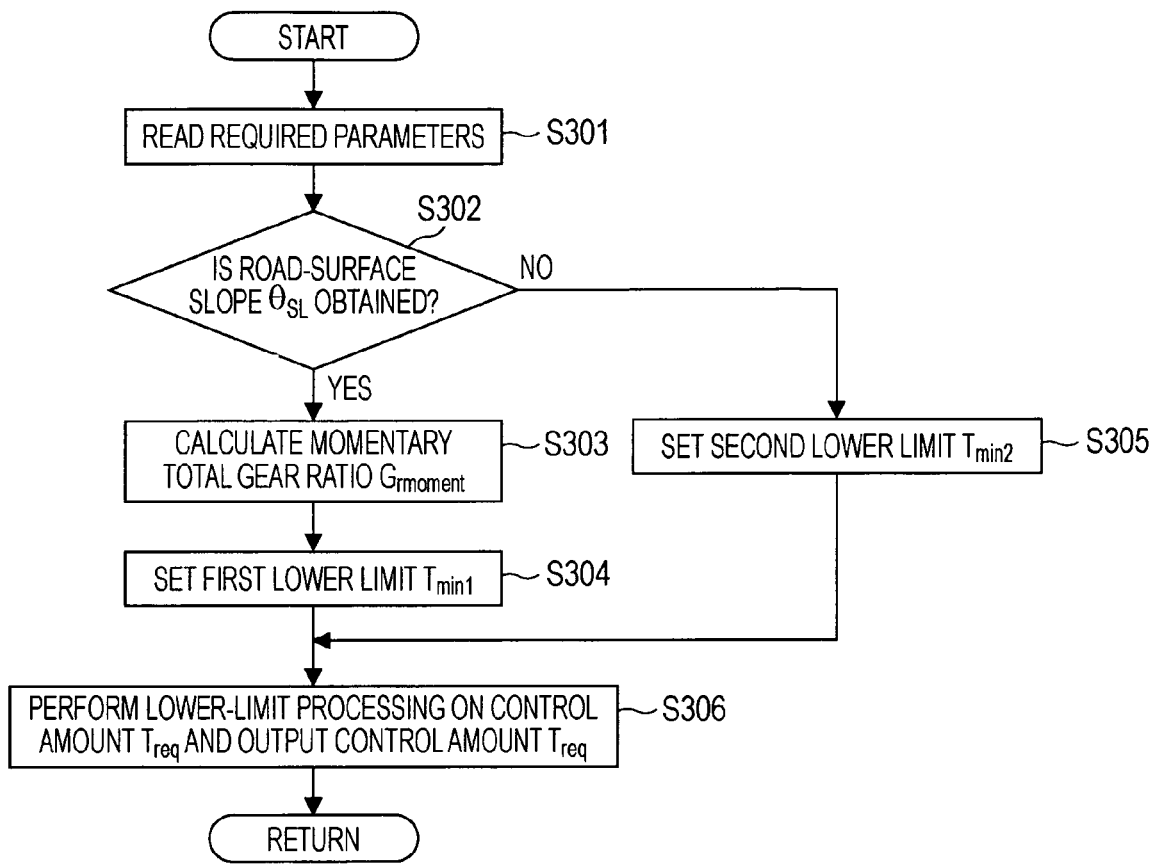
FIG. 14 is a flow chart of a control-amount correcting program.
Figure 15:
FIG. 15 is a characteristic diagram of a second lower limit.

FIGS. 11 to 15 illustrate a second embodiment of the present invention. FIG. 11 is a functional block diagram of a driving force control device according to the second embodiment. FIG. 12 is a flow chart of a driving force control program. FIG. 13 is a functional block diagram of a control-amount correcting portion. FIG. 14 is a flow chart of a control-amount correcting program. FIG. 15 is a characteristic diagram of a second lower limit. Referring to FIG. 11, in addition to the components connected to the driving force control device in the first embodiment, a driving force control device 100 according to the second embodiment has an inclination-angle sensor 20 connected thereto, which serves as road-surface slope detecting means. Moreover, the driving force control device 100 is equipped with a control-amount correcting portion is. Thus, the driving-force correcting means constituted by the excessive-tire-force calculating portion 1p, the over-torque calculating portion 1q, and the control-amount calculating portion 1r additionally includes the control-amount correcting portion is, and determines a lower limit of a driving force on the basis of a road-surface slope so as to perform lower-limit correction of the driving force.

Components and portions in the second embodiment that have the same configurations and functions to those in the driving force control device described in the first embodiment are given the same reference numerals, and detailed descriptions of those components and portions will not be repeated. Likewise, control programs and steps performed in the second embodiment that are equivalent to those performed in the driving force control device described in the first embodiment are indicated with the same reference numerals, and detailed descriptions of those control programs and steps will not be repeated.

The control-amount correcting portion is receives an engine speed $N_e$ from the engine-speed sensor 12, an accelerator opening $\theta_{ACC}$ from the accelerator-opening sensor 13, a main transmission gear ratio i and a turbine speed $N_t$ of the torque converter from the transmission control unit 14, a road-surface slope $\theta_{SL}$ from the inclination-angle sensor 20, and a control amount $T_{req}$ from the control-amount calculating portion 1r. Based on a control-amount correcting program to be described hereinafter, the control-amount correcting portion 1s corrects the control amount $T_{req}$ and outputs the corrected control amount $T_{req}$ to the engine control unit 2. The control-amount correcting portion is will be described in detail below.

Referring to FIG. 13, the control-amount correcting portion is mainly includes a momentary-total-gear-ratio calculating portion 30a, a first lower-limit setting portion 30b, a second lower-limit setting portion 30c, and a control-amount lower-limit processing portion 30d.

The momentary-total-gear-ratio calculating portion 30a receives the engine speed $N_e$ from the engine-speed sensor 12, and the main transmission gear ratio i and the turbine speed $N_t$ of the torque converter from the transmission control unit 14. As described previously in relation to the transmission-output-torque calculating portion 1c, the momentary-total-gear-ratio calculating portion 30a calculates a momentary total gear ratio $G_{rmoment}$ (=t·i) by multiplying a torque ratio t of the torque converter by the main transmission gear ratio i, and outputs the calculated value to the first lower-limit setting portion 30b (the torque ratio t being determined by referring to a preliminarily set map indicating a relationship between a rotational speed (=$N_t/N_e$) of the torque converter and a torque ratio of the torque converter).

The first lower-limit setting portion 30b receives the road-surface slope $\theta_{SL}$ from the inclination-angle sensor 20 and the momentary total gear ratio $G_{rmoment}$ from the momentary-total-gear-ratio calculating portion 30a. The first lower-limit setting portion 30b determines a first lower limit $T_{min1}$ by calculating a lower limit of the control amount $T_{req}$ obtained from the control-amount calculating portion 1r on the basis of the road-surface slope $\theta_{SL}$ using the following expression (75), and outputs the first lower limit $T_{min1}$ to the control-amount lower-limit processing portion 30d.

$$T_{min1} = \sin(\theta_{SL}) \cdot W/(G_{rmoment} \cdot i_f) + 50 \quad (75)$$

In other words, in the expression (75), the first lower limit $T_{min1}$ of the control amount $T_{req}$ increases in accordance with the road-surface slope $\theta_{SL}$.

The second lower-limit setting portion 30c receives the accelerator opening $\theta_{ACC}$ from the accelerator-opening sensor 13. By referring to a preliminarily set map as shown in FIG. 15, the second lower-limit setting portion 30c sets a lower limit of the control amount $T_{req}$ obtained from the control-amount calculating portion 1r on the basis of the accelerator opening $\theta_{ACC}$ as a second lower limit $T_{min2}$, and outputs the second lower limit $T_{min2}$ to the control-amount lower-limit processing portion 30d.

The control-amount lower-limit processing portion 30d receives the road-surface slope $\theta_{SL}$ from the inclination-angle sensor 20, the control amount $T_{req}$ from the control-amount calculating portion 1r, the first lower limit $T_{min1}$ from the first lower-limit setting portion 30b, and the second lower limit $T_{min2}$ from the second lower-limit setting portion 30c. Although the control-amount lower-limit processing portion 30d generally performs lower-limit processing of the control amount $T_{req}$ using the first lower limit $T_{min1}$ (namely, sets the control amount $T_{req}$ higher than or equal to the lower limit), if the road-surface slope $\theta_{SL}$ cannot be obtained, the control-amount lower-limit processing portion 30d determines that it is also difficult to obtain the first lower limit $T_{min1}$. In that case, the control-amount lower-limit processing portion 30d performs lower-limit processing of the control amount $T_{req}$ using the second lower limit $T_{min2}$, and outputs the control amount higher than or equal to the second lower limit $T_{min2}$ to the engine control unit 2.

As mentioned above, the control-amount correcting portion 1s is included in the driving-force correcting means. The driving-force correcting program performed by the control-amount correcting portion 1s is as shown in the flow chart in FIG. 14. Specifically, in step S301, required parameters are read, which include an engine speed $N_e$, an accelerator opening $\theta_{ACC}$, a main transmission gear ratio i, a turbine speed $N_t$ of the torque converter, a road-surface slope $\theta_{SL}$, and a control amount $T_{req}$.

In step S302, it is determined whether or not a road-surface slope $\theta_{SL}$ is obtained. If yes, the program proceeds to step S303 where the momentary-total-gear-ratio calculating portion 30a calculates a momentary total gear ratio $G_{rmoment}$. The program then proceeds to step S304 where the first lower-limit setting portion 30b sets a first lower limit $T_{min1}$ on the basis of the aforementioned expression (75).

If it is determined in step S302 that a road-surface slope $\theta_{SL}$ is not obtained, the program proceeds to step S305 where the second lower-limit setting portion 30c refers to a preliminarily set map as shown in FIG. 15 so as to set a second lower limit $T_{min2}$.

After the lower limit is set in step S304 or S305, the program proceeds to step S306 where the control-amount lower-limit processing portion 30d sets the control amount $T_{req}$ higher than or equal to the lower limit, and outputs the set control amount $T_{req}$ to the engine control unit 2. Finally, this exits the program.

In this manner, the control-amount correcting portion 1s performs lower-limit processing on the control amount $T_{req}$ obtained from the control-amount calculating portion 1r using the first lower limit $T_{min1}$ based on the road-surface slope $\theta_{SL}$. On the other hand, if the control-amount correcting portion 1s cannot obtain the road-surface slope $\theta_{SL}$ and therefore cannot set the lower limit using the first lower limit $T_{min1}$, the control-amount correcting portion 1s alternatively performs lower-limit processing using the second lower limit $T_{min2}$ based on the accelerator opening $\theta_{ACC}$. Consequently, a drawback is properly prevented from occurring during uphill driving on, for example, a slope. Furthermore, in addition to the prevention of an occurrence of excessive driving force in the present, an excessive driving force that may presumably be generated in the future is also inhibited. Thus, the grip forces of the tires can be appropriately maintained, whereby the driving stability of the vehicle can be improved.

In the second embodiment, a second lower limit $T_{min2}$ based on an accelerator opening $\theta_{ACC}$ is set in view of the case where a road-surface slope $\theta_{SL}$ cannot be obtained and thus the lower limit cannot be set using a first lower limit $T_{min1}$. However, if a road-surface slope $\theta_{SL}$ can assuredly be obtained and thus there is a low possibility that the lower limit cannot be set using a first lower limit $T_{min1}$, the setting process of a second lower limit $T_{min2}$ does not necessarily need to be performed.

The driving force control performed by the driving force control device 100 is shown in the flow charts in FIGS. 2 and 12. Since step S101 to step S119 performed by the driving force control device 100 are the same as those performed in the first embodiment, detailed descriptions of those steps will not be repeated. In step S120, the driving force control device 100 performs a control-amount correcting process with respect to the control amount $T_{req}$ determined in step S119.

In step S120, the control-amount correcting portion 1s performs lower-limit processing on the control amount $T_{req}$ using the first lower limit $T_{min1}$ based on the road-surface slope $\theta_{SL}$. If the road-surface slope $\theta_{SL}$ cannot be obtained and thus the lower limit cannot be set using the first lower limit $T_{min1}$, the control-amount correcting portion is performs lower-limit processing using the second lower limit $T_{min2}$ based on the accelerator opening $\theta_{ACC}$, and outputs the control amount higher than or equal to the second lower limit $T_{min2}$ to the engine control unit 2. Finally, this exits the program.

Accordingly, the second embodiment is similar to the first embodiment in that a torque value at which a tire force to be generated on each wheel based on a request from the driver exceeds the friction-circle limit value is compared with a torque value at which a tire force currently being generated on the wheel exceeds the friction-circle limit value, and that the driving force is corrected by subtracting the larger one of the two values from a driving force requested by the driver. Consequently, an over-torque condition can be appropriately corrected not only for the present but also for the future, whereby appropriate control against spinning and plowing can be implemented. Thus, the grip forces of the tires can be appropriately maintained, whereby the driving stability of the vehicle can be improved.

Since the correction value to be subtracted from the driving force requested by the driver is simply a torque value at which a tire force exceeds the friction-circle limit value, a sudden reduction of the driving force in the longitudinal direction is prevented. This prevents the driver from feeling awkward or from having a sense of dissatisfaction due to a lack of acceleration (i.e. the driving force is inhibited only by an amount $F_{xa}$ in FIG. 10).

Alternatively, the grip forces of the tires may be maintained by properly reducing the driving force in the longitudinal direction (namely, the driving force may be inhibited only by an amount Fxb in FIG. 10). In that case, the control is realized by adding signal lines shown with dashed lines in FIG. 11, and by changing the calculations performed by the individual-wheel requested-excessive-tire-force calculating portion 1n and the individual-wheel excessive-tire-force calculating portion 1o in the similar manner to the first embodiment.

What is claimed is:

1. A vehicle driving force control device comprising:
   first-tire-force estimating means configured to estimate a tire force to be generated on a wheel based on a request from a driver as a first tire force;
   second-tire-force estimating means configured to estimate a tire force currently being generated on the wheel as a second tire force;
   friction-circle limit-value setting means configured to set a friction-circle limit-value of a tire force;
   first-excessive-tire-force estimating means configured to estimate a tire force exceeding the friction-circle limit-value on the basis of the first tire force and the friction-circle limit-value as a first excessive tire force;
   second-excessive-tire-force estimating means configured to estimate a tire force exceeding the friction-circle limit-value on the basis of the second tire force and the friction-circle limit-value as a second excessive tire force; and driving-force correcting means configured to correct a driving force on the basis of the first excessive tire force and the second excessive tire force.

2. The vehicle driving force control device according to claim 1, wherein the driving-force correcting means compares the first excessive tire force with the second excessive tire force, and corrects the driving force on the basis of the larger one of the two excessive tire forces.

3. The vehicle driving force control device according to claim 2, wherein the driving-force correcting means corrects the driving force by subtracting the larger one of the two excessive tire forces from a driving force requested by the driver.

4. The vehicle driving force control device according to claim 2, wherein the driving-force correcting means corrects the driving force by subtracting a longitudinal-direction component of the larger one of the two excessive tire forces from a driving force requested by the driver.

5. The vehicle driving force control device according to claim 1, further comprising road-surface slope detecting means configured to detect a road-surface slope of a road being driven on,
   wherein the driving-force correcting means determines a lower limit of the driving force based on the road-surface slope and sets the driving force to the lower limit when the corrected driving force is under the lower limit.

6. The vehicle driving force control device according to claim 5, further comprising accelerator-opening detecting means configured to detect an accelerator opening,
   wherein if the driving-force correcting means cannot determine the lower limit of the driving force based on the road-surface slope, the driving-force correcting means determines a second lower limit of the driving force based on the accelerator opening,
   wherein the driving-force correcting means sets the driving force to the second lower limit when the corrected driving force is under the second lower limit.

7. The vehicle driving force control device according to claim 5, wherein the driving-force correcting means compares the first excessive tire force with the second excessive tire force, and sets the driving force by subtracting the larger one of the two excessive tire forces from a driving force requested by the driver.

8. The vehicle driving force control device according to claim 5, wherein the driving-force correcting means compares the first excessive tire force with the second excessive tire force, and sets the driving force by subtracting a longitudinal-direction component of the larger one of the two excessive tire forces from a driving force requested by the driver.

9. The vehicle driving force control device according to claim 1, further comprising an accelerator-opening sensor configured to detect an accelerator opening,
   wherein if the excessive-tire-force calculating portion cannot determine the lower limit of the driving force based on the road-surface slope, the excessive-tire-force calculating portion determines a second lower limit of the driving force based on the accelerator opening,
   wherein the excessive-tire-force calculating portion sets the driving force to the second lower limit when the corrected driving force is under the second lower limit.

* * * * *